(12) United States Patent
Manduchi

(10) Patent No.: US 11,640,200 B2
(45) Date of Patent: May 2, 2023

(54) GAZE-CONTINGENT SCREEN MAGNIFICATION CONTROL

(71) Applicant: The Regents of the University of California, Oakland, CA (US)

(72) Inventor: Roberto Manduchi, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/210,234

(22) Filed: Mar. 23, 2021

(65) Prior Publication Data

US 2021/0294413 A1 Sep. 23, 2021

Related U.S. Application Data

(60) Provisional application No. 62/993,391, filed on Mar. 23, 2020.

(51) Int. Cl.
*G06F 3/01* (2006.01)
*G06T 3/40* (2006.01)

(52) U.S. Cl.
CPC ............. *G06F 3/013* (2013.01); *G06T 3/40* (2013.01)

(58) Field of Classification Search
CPC .................. G06F 3/013; G06T 3/40
See application file for complete search history.

(56) References Cited

U.S. PATENT DOCUMENTS

| | | | |
|---|---|---|---|
| 2011/0006978 A1* | 1/2011 | Yuan | G06F 3/0481 345/156 |
| 2015/0128075 A1* | 5/2015 | Kempinski | G06F 3/013 715/765 |
| 2015/0309565 A1* | 10/2015 | Beri | G06F 3/04845 715/776 |
| 2018/0275753 A1* | 9/2018 | Publicover | G06K 9/00604 |

* cited by examiner

*Primary Examiner* — Chanh D Nguyen
*Assistant Examiner* — Ngan T. Pham-Lu
(74) *Attorney, Agent, or Firm* — Gates & Cooper LLP

(57) ABSTRACT

A system for magnifying content including a display; a camera for acquiring a user's eye gaze direction onto a display so as to obtain gaze data; and a computer coupled to the display, wherein the computer maps the gaze data onto a desired location on the display, provides a center of magnification on the display, and moves the center of magnification onto the desired location so as to magnify the content on the display.

22 Claims, 12 Drawing Sheets

GAZE-CONTINGENT SCREEN MAGNIFICATION CONTROL

CROSS REFERENCE TO RELATED APPLICATIONS

This application claims the benefit under 35 U.S.C. Section 119(e) of and commonly-assigned U.S. Provisional Patent Application Ser. No. 62/993,391, filed on Mar. 23, 2020, by Roberto Manduchi, entitled "GAZE-CONTINGENT SCREEN MAGNIFICATION CONTROL", (284.0005-US-P1); which application is incorporated by reference herein.

BACKGROUND OF THE INVENTION

1. Field of the Invention

The present disclosure relates to methods and systems for magnifying text or graphics on a screen to aid reading of the text or graphics.

2. Description of the Related Art (Note: This application references a number of different references as indicated throughout the specification by one or more names followed by a year in brackets, e.g., [name year]. A list of these different references ordered according to these citations can be found below in the section entitled "References." Each of these references is incorporated by reference herein.)

Many people living with low vision use screen magnifiers to read documents and web pages on a computer. As more and more textual content is consumed online rather than in printed form, screen magnifiers are taking on the role of more traditional desktop video magnifiers (sometimes called CCTV magnifiers), which have been used for decades to access printed text. Unlike screen readers, which translate the screen content into a format amenable to text-to-speech communication, screen magnifiers give users visual access to graphical information and allow them to appreciate even complex layouts displayed on the screen. In many ways, a screen magnifier functions like a magnifying glass—while being purely software-based. It is the tool of choice for those individuals with some functional vision who do not need to (or choose not to) resort to screen readers. Multiple types of screen magnification are available on the market, either integrated in operating systems (Windows or MacOS), or in the form of specialized software such as ZoomText or MAGic.

Screen magnification is a powerful access technology, but it is not without its shortcomings. The common crux of screen magnification is that it requires continuous manual scrolling (using the mouse or trackpad) in order to move the focus of magnification (located at the mouse cursor), which determines the portion of the document to be magnified. Continuous scrolling of magnified content may represent a burden for the viewer (page navigation problem; [Beckmann and Legge 1996]). Manual scrolling often results in slow reading [Harland et al 1998] and can be challenging for those who don't have full motor control of their hands.

SUMMARY OF THE INVENTION

Persons with low vision often use screen magnification software. Screen magnification conventionally requires continuous control of the onscreen content by moving the focus of magnification with the mouse or the trackpad. The present invention discloses a system for automatically controlling the focus of magnification by means of the user's own eye gaze, which is measured/acquired by a commercial or specialized gaze tracker or camera. In another example, the eye gaze can be determined using an algorithm that uses video data from the camera on the screen. The system further includes a computer that maps gaze data into the desired location of the center of magnification on the screen; and a system that moves the center of magnification into the desired location. Examples of the system for magnifying content on a display include, but are not limited to, the following.

1. A system comprising a display;
a camera for acquiring a user's eye gaze direction onto a display so as to obtain gaze data; and
a computer coupled to the display, wherein the computer:
maps the gaze data onto a desired location on the display corresponding to the gaze direction,
provides a center of magnification on the display, and
moves the center of magnification onto the desired location so as to magnify the content on the display.

2. The system of paragraph 1, further comprising a gaze tracking device including the camera, wherein the gaze tracking device acquires the eye gaze direction.

3. The system of paragraph 1, wherein the computer determines the gaze data from video data outputted from the camera connected to the display.

4. The system of paragraph 1, wherein the content comprises text or graphics outputted to the display from the computer for reading by the user.

5. The system of paragraph 1, wherein the computer comprises a tablet or a smartphone comprising the display.

6. A computer implemented method for magnifying content on a display, comprising:
measuring a user's gaze so as to locate a gaze point on a display, the gaze point comprising a location on the display at which the user is gazing;
determining a magnification area and an un-magnified area on the display so that gaze point is within the magnified area; and
magnifying an image on the display in the magnification area so that the user can view the image representing at least a portion of the content comprising text or graphics.

7. The method of paragraph 6, wherein the determining further comprises locating a first pixel p in the un-magnified area prior to the gaze point moving onto the first pixel p, wherein the magnifying comprises mapping the image on the first pixel onto a second pixel p at a predetermined location.

8. The method of paragraph 7, wherein the locating comprises predicting or identifying the first pixel based on the measurement of the user's gaze and the nature of the viewing being performed by the user.

9. The method of paragraph 7, wherein the magnification area comprises a focus of magnification and the method further comprises moving the focus of magnification so that the predetermined location is a substantially fixed position on the display.

10. The method of paragraph 6 or 7, wherein the determining or locating comprises identifying a pixel on which the gaze point is located and the magnification area comprises a focus of magnification, the method further comprising moving the focus of magnification onto the pixel when the pixel is in the un-magnified area so that $m(t)=p(t)=g(t)$, where $m(t)$ is the position of the FOM as a function of time, p(t) is the pixel on which the gaze point is located as a function of time, and g(t) is the position of the gaze point as a function of time.

11. The method of paragraph 6, wherein the determining comprises (1) fixing the gaze point on the display in the magnification area, or (2) tracking the gaze point and positioning the magnification area over the tracked gaze point, or a combination of (1) and (2).

12. The method of paragraph 6, further comprising the computer automatically scrolling the content on the display when the gaze point is in a scroll zone on the display.

13. The method of paragraph 12, wherein the scroll zone is outside a central region of the display and the scrolling comprises scrolling the content towards an opposite side of the display so that more of the content enters the magnification area as the content is read by the user.

14. The method of paragraph 13, wherein the central region has an area in a range of $1/10$-$1/3$ of the area of the display, a speed of the scrolling is a function of the amount of magnification, and the speed in a horizontal direction is increased when the gaze point is in the leftmost scroll zone so as to facilitate moving to the beginning of a new line of text.

15. The method of paragraph 6, wherein the magnification area comprises a focus of magnification and the focus of magnification (FOM) magnifies the image so as to lead the gaze point to a target point on the display.

16. The method of paragraph 15, further comprising moving the FOM towards the target point when the gaze point moves away from the target point, the FOM moving at a speed proportional to a distance between the gaze point and the target point, up to a predetermined threshold speed.

17. The method of paragraph 16, wherein the target point is at a center of the screen.

18. The method of paragraph 6, wherein the magnification area comprises a focus of magnification and the method further comprises moving the FOM smoothly towards the gaze point.

19. A system for magnifying content on a display, comprising:

a computer comprising or coupled to a display; and a camera measuring a user's gaze so as to locate a gaze point on the display, the gaze point comprising a location on the display at which the user is gazing; and the computer including one or more processors; one or more memories; and an application stored in the one or more memories, wherein the application executed by the one or more processors:

determines a magnification area and an unmagnified area on the display so that the gaze point is within the magnified area; and instructs the display to magnify an image on the display in the magnification area so that the user can view the image comprising at least a portion of the content comprising text and/or graphics.

20. A computer implemented method for magnifying content on a display, comprising:

acquiring a user's eye gaze direction onto the display so as to obtain gaze data;

mapping the gaze data to a gaze point on the display corresponding to the gaze direction, using a computer;

defining a magnification area and an unmagnified area of the display so that the gaze point is within the magnification area; and magnifying the content in the magnification area so that the user can view or read the content in the magnification area.

BRIEF DESCRIPTION OF THE DRAWINGS

Referring now to the drawings in which like reference numbers represent corresponding parts throughout:

FIG. 1A: Screen lens magnification of the 3-column document. FIG. 1B: Full-screen magnification of the 1-column document.

FIGS. 2A-2F. Sample data from our trials from different participants. The colored line on the (unmagnified) screenshots represents the track of the FoM (with color changing from purple to yellow as a function of time). The X- and Y-coordinate of the recorded gaze points are shown as blue dots at the bottom and to the right, respectively, of the screenshots. The same plots show the coordinates of p(t), the location on the un-magnified screen of the element been looked at. FIGS. 2A, 2C and 2E: manual control with full screen (FS) or screen lens (LS) magnification. FIGS. 2B, 2D, and 2F: gaze-contingent control using the FS-I, FS-DZ, or SL-I algorithms.

Figure 1A:
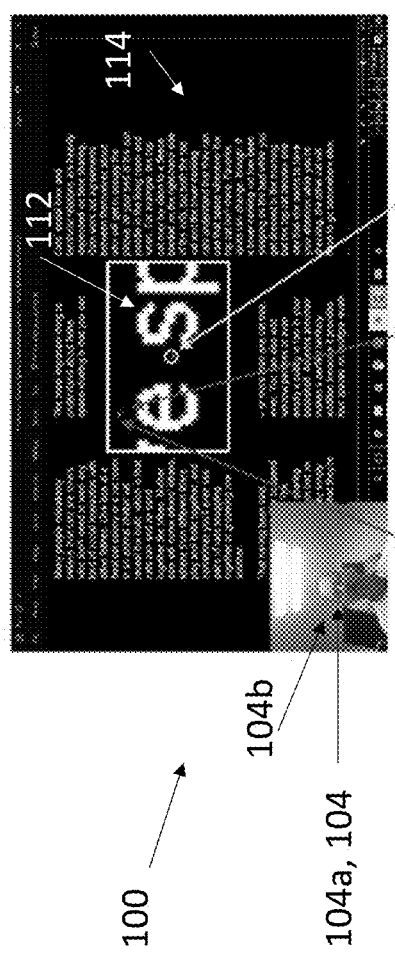
FIGS. 1A-1B. Screenshots from our Matlab application used to reconstruct the sessions on the base of the recorded data.

Some of the drawings are better understood when provided in color and the specification makes reference to color versions of the drawings. Applicant considers the color versions of the drawings as part of the original disclosure and reserves the right to provide color versions of the drawings in later proceedings.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

The need for continuous manual scrolling of the magnified content could be mitigated by technology designed to assist the user in moving the focus of magnification. In this disclosure, we describe a new system of gaze-based magnification control. The system enables scrolling control by means of the viewer's own gaze, which is computed by an eye gaze tracker. This hands-free modality can in some examples afford a more natural experience when reading onscreen content than standard approaches that require use of mouse or trackpad. The gaze-contingent paradigm has been proposed before for multiple applications [Toet 2006, Aguilar and Castet 2012, Wallis et al 2015, Werblin et al 2015] including adaptive contrast enhancement and magnification. However, to the best of our knowledge, this is the first time that gaze-contingent processing is considered for the control of a regular screen magnifier.

The present disclosure describes two studies, comprising an initial data collection experiment, followed by a test of gaze-contingent magnification control algorithms. In Study 1, six participants with low vision operated two types of customized screen magnification software to read text from two with screen magnification. P1, P4 and P6 were accustomed to magnifying the content of a Word document by "zooming" on the trackpad. P2 regularly used the AI Squared ZoomText Reader software (P4 also used this software on occasion). P3 mentioned that she normally increased the font size of a document (Ctrl+ on Mac) for better reading. P5, who rarely used a computer, never used screen magnification before. Two participants (P1 and P2) used eyeglasses during the experiment.

TABLE 1

Characteristics of participants, including visual acuity (OD,OS = right, left eye). The logMAR score is the base 10 logarithm of the minimum angle of resolution, measured in minutes of arc (1 minute of arc = 1/60 of 1°). A person with normal vision has acuity of 0 logMAR.

|    | Gender | Age | Condition | Acuity OD (logMAR) | Acuity OS (logMAR) |
|----|--------|-----|-----------|--------------------|--------------------|
| P1 | M      | 28  | Stargardt | 0.86               | 0.86               |
| P2 | M      | 53  | Toxoplasmic chorioretinitis | 0.86 | 0.98               |
| P3 | F      | 73  | Wet AMD   | 1.10               | 1.40               |
| P4 | F      | 31  | Stargardt | 1.02               | 1.12               |
| P5 | F      | 80  | Dry AMD   | 1.06               | 0.64               |
| P6 | M      | 42  | Ocular albinism | 0.36         | 0.36               |
| P7 | F      | 60  | Stargardt | 0.78               | 0.80               |

1. Example Study 1: Data Acquisition

The goal of Study 1 was to observe how individuals with low vision operate a manual screen magnification control system, and to gather two types of data: mouse tracks (where the mouse controls the focus of magnification); and gaze tracks, which are the points on the screen where the user fixates while reading magnified text. Since our final goal is the design of a gaze-contingent magnification controller, it is important to understand if and how gaze correlates with the focus of magnification as it is moved by the user. The protocol used for both Study 1 and Study 2 was approved by our school's IRB.

1.1 Method 1.1.1 Participants

We originally recruited seven participants for this study from the optometry clinic in our university. One of the participants was not able to complete the trials, and thus was removed from the study. The participants' characteristics are summarized in Table 1 (P1-P6). They had varying prior experience with screen magnification. P1, P4 and P6 were accustomed to magnifying the content of a Word document by "zooming" on the trackpad. P2 regularly used the AI Squared ZoomText Reader software (P4 also used this software on occasion). P3 mentioned that she normally increased the font size of a document (Ctrl+ on Mac) for better reading. P5, who rarely used a computer, never used screen magnification before. Two participants (P1 and P2) used eyeglasses during the experiment. with screen magnification. P1, P4 and P6 were accustomed to magnifying the content of a Word document by "zooming" on the trackpad. P2 regularly used the AI Squared ZoomText Reader software (P4 also used this software on occasion). P3 mentioned that she normally increased the font size of a document (Ctrl+ on Mac) for better reading. P5, who rarely used a computer, never used screen magnification before. Two participants (P1 and P2) used eyeglasses during the experiment.

1.1.2. Apparatus

We created a screen magnification software application for Windows 10, using the Magnification API and the Tobii EyeX Engine [Tobii EyeX SDK]. The application ran on a Dell Latitude 3470 laptop computer, with screen size of 31×17.5 cm, and resolution of 1366×768 pixels. The computer was connected to a Tobii X2-30 eye tracker, attached to the lower edge of the screen. The X2-30 tracker captures data at 30 Hz and has nominal accuracy of 0.4° [Tobii 2019] (although in practice the tracking accuracy often seemed to be lower than this nominal value). It does not require head stabilization, which makes it suitable for "real world" applications. For the eye tracker to function correctly, a per-user prior calibration phase is necessary. This operation, which may take a few minutes, requires the user to follow with their gaze a dot moving on the screen, until prompted by the system that calibration has been completed. This process may have to be repeated a few times before a satisfactory calibration is obtained.

TABLE 2

Measurements from our Study 1 (shaded) and Study 2 trials, using manual control (FS, SL) or gaze-based control (FS-DZ, FS-I, SL-I) on 1-column and 3-columns documents. Top value: Reading speeds (in words/minute.) Bottom value: Pearson's correlation coefficient between the horizontal coordinate of FoM and of gaze point (when gaze tracking was successful.)

|    | FS 1col | SL 1col | FS 3col | SL 3col | FS DZ 1col | FS I 1col | SL I 1col | FS DZ 3col | FS I 3col | SL I 3col |
|----|---------|---------|---------|---------|------------|-----------|-----------|------------|-----------|-----------|
| P1 | 39      | 26      | 49      | 55      | —          | —         | —         | —          | —         | —         |
|    | $\rho = 0.6$ | $\rho = 0.9$ | $\rho = -0.2$ | $\rho = 0.5$ | | | | | | |
| P2 | 29      | 18      | 46      | 50      | 36         | 55        | —         | 42         | 21        | —         |
|    | —       | $\rho = 0.9$ | $\rho = 0.6$ | $\rho = 0.6$ | $\rho = 0.1$ | $\rho = 0.0$ | | $\rho = 0.0$ | $\rho = -0.2$ | |
| P3 | 23      | 29      | 37      | 34      | —          | —         | —         | —          | —         | —         |
|    | —       | —       | —       |         | | | | | | |
| P4 | 84      | 61      | 88      | 104     | —          | —         | —         | —          | —         | —         |
|    | $\rho = -0.2$ | $\rho = 0.9$ | $\rho = -0.1$ | $\rho = 0.4$ | | | | | | |
| P5 | 20      | 14      | 24      | 17      | —          | —         | —         | —          | —         | —         |
| P6 | 149     | 122     | 208     | 191     | 112        | 114       | 55        | 122        | 158       | 106       |
|    | $\rho = 0.4$ | $\rho = 0.9$ | $\rho = -0.2$ | $\rho = 0.0$ | $\rho = 0.0$ | $\rho = 0.0$ | $\rho = 0.7$ | $\rho = 0.0$ | $\rho = 0.0$ | $\rho = 0.3$ |

TABLE 2-continued

Measurements from our Study 1 (shaded) and Study 2 trials, using manual control (FS, SL) or gaze-based control (FS-DZ, FS-I, SL-I) on 1-column and 3-columns documents. Top value: Reading speeds (in words/minute.) Bottom value: Pearson's correlation coefficient between the horizontal coordinate of FoM and of gaze point (when gaze tracking was successful.)

| | FS 1col | SL 1col | FS 3col | SL 3col | FS DZ 1col | FS I 1col | SL I 1col | FS DZ 3col | FS I 3col | SL I 3col |
|---|---|---|---|---|---|---|---|---|---|---|
| P7 | — | — | — | — | 65 $\rho = 0.0$ | 49 $\rho = 0.0$ | — | 57 $\rho = 0.0$ | 68 $\rho = 0.0$ | 54 $\rho = 0.4$ |

Our application allows one to select between full screen (FS) and screen lens (SL) (sometimes called picture-in-picture) magnification. Full screen magnification expands the content of the whole screen around the focus of magnification (FoM), which coincides with the location of the mouse cursor. This results in only a portion of the onscreen content being visible within the screen viewport. Screen lens magnification uses the paradigm of a magnifying glass to only enlarge a rectangular portion of the screen (note that also in this case, the FoM coincides with the location of the cursor as controlled by the mouse). Full screen magnification is generally considered easier to use, as it requires less user interaction than screen lens control [Blenkhorn et al. 2003]. On the other hand, use of a screen lens enables visual access to the "context" (the part of the document outside the lens, which is not magnified). This can be very useful when exploring documents with complex layouts such as web pages [Bruggeman and Legge 2002]. In both modalities, participants were able to select the desired magnification factor (over a logarithmic scale) using the keyboard. For the screen lens modality, participants were able to vary the width and the height of the rectangular "lens", still using the keyboard. The participants could choose to invert the colors of the screen if they so preferred. The application captured all mouse movements as well as all measured gaze points (i.e., the points on the screen where gaze was directed, as estimated by the gaze tracker). In addition, the application continuously captured images from the laptop's camera. Although these images were not relevant for the work presented in this contribution, we plan to use them in future research on camera-based eye gaze tracking.

Figure 1B:
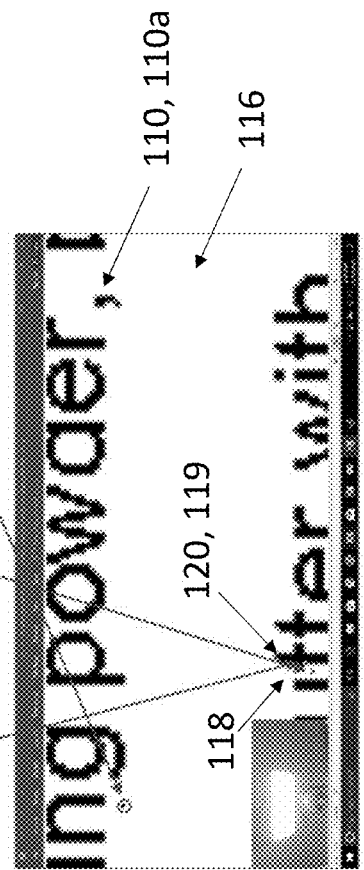

The data streams (mouse tracks, gaze point tracks, and user commands such as changes of the magnification factor or of the screen lens dimensions) were recorded and time-stamped in reference to a common time base. We built a Matlab application that reconstructs the whole session based on the recorded data and shows the gaze point location at each frame. Two screenshots of the display 100 from this application with either magnification modality are shown in FIGS. 1A-1B. Note that the location of the gaze point 102 on the display 100 and the image from the camera, which are visible in these screenshots, were not displayed on the screen during the trials.

Also shown in FIGS. 1A-1B are the user's 104b eye gaze 104a or eye gaze direction 104 onto the display, a center of magnification 106 on the display 100 (or screen), a focus of magnification 107 on the display, the last fixation point 108 of the eye gaze 104a, the content 110 (e.g., text 110a) being read by the user 104b, a magnification area 112 on the display, an unmagnified area 114 on the display, and an image 116 of at least a portion of the content 110. In one or more examples, the content 110 is magnified by mapping the image 116 on the first pixel 118 (at the gaze point 102) onto a second pixel 120 at a predetermined location 119.

1.1.3 Experiment

Each participant underwent a sequence of four trials. In each trial, participants were asked to read two paragraphs each from two Word documents using a specific screen magnification modality. Two types of documents were considered: a 1-column document, and a 3-column document. The 1-column document contained a Martha Stewart recipe for pistachio cannoli cake. The 3-column document was an essay about the social lives of cats. Text was displayed with a 9-point Helvetica font, with single line spacing and a whole blank line between paragraphs. The single-column document had 0.5" left and right margins. The three-column document had columns with width of 1.67" and spacing of 0.5" between columns. The documents were expanded (using Word's zoom setting) by a fixed factor such that the letter-sized documents covered a sizeable portion of the screen. The screen magnification controlled by the participants was applied on this document layout.

In the first two trials, participants accessed the single-column document, first with full screen magnification (first two paragraphs) then with screen lens magnification (next two paragraphs). They repeated the same sequence in the last two trials, this time on the three-column document. Note that each column in the three-column document contained two paragraphs. Hence, participants never switched columns while reading with a given magnification modality.

The experiment was conducted in a small laboratory room without windows, with fluorescent ceiling lighting. Participants sat on a chair in front of the desk on which the laptop computer was placed, in such a way that they could comfortably operate the wired mouse used for FoM control. Care was taken to ensure that the participants always kept at a distance of at least 40 cm from the gaze tracker, as this is the minimum distance required for correct tracking. This was obtained by placing the laptop on the desk surface such that its screen was 40 cm away from the desk's front edge. The experimenter made sure that participants never moved their head beyond the desk's front edge. Participants were asked if they would prefer the room lights to be turned off during the trials. Only participant P2 opted for the lights off, and this only during the first trial. They were also asked whether they would prefer dark text on light background or vice-versa. Only P2 opted for light text on dark background.

Before starting the experiment, participants completed the gaze tracker calibration procedure. Then, they were explained the correct usage of each magnification modality, including selection of the magnification factor and of the size of the screen lens. Participants were encouraged to experiment with different choices of these parameters before starting the trials. Although they were allowed to modify these parameters during a trial, this never occurred. When a participant felt confident enough with use of the system, the first trial begun (signaled by pressing a key in the keyboard), and the participant started reading aloud the assigned paragraphs of text. When a participant finished reading both paragraphs, another key was pressed, terminating the trial. The remaining trials were conducted in a similar fashion. All sessions were videotaped.

1.2 Results 1.2.1. General Observations

All participants (except for the one who was excluded from the experiment, as mentioned earlier) were able to successfully complete all trials. The magnification factor α chosen by the participants ranged from 2.25 (P1) to 11.4 (P2, P3, P4). Note that occasionally a participant changed the magnification factor between trials. Intuitively, one should expect that the magnification factor chosen should inversely correlate with the person's visual acuity, as well as with the viewing distance. A standard functional measure is the preferred angular print size, which is the angle subtended by an x-height character (with the desired magnification) to the observer's viewpoint. In our study, the preferred angular print size, computed based on the chosen magnification and distance to the screen, ranged from 1.5 to 2.3 logMAR, which is consistent with the findings of [Granquist, et al. 2018].

Another degree of freedom is represented by the size of the "lens" in the screen lens magnification mode. Intuitively, a smaller lens requires more accurate manual control, to ensure that the magnification zone is well centered on the desired text location, and thus may be more difficult to use. On the other hand, a large lens occupies more screen real estate, thus offsetting one of the benefits of the screen lens mode, namely the ability to maintain visibility of the context beyond the magnified area. The chosen lens size varied from 455×192 pixels (P1) to 1366×308 pixels (P3) (note that with this size of the lens, screen lens is functionally almost equivalent to full screen magnification). Some participants used slightly different screen lens size values for the trials with the 1-column and the 3-column documents. The aspect ratio (width/height) of the lens varied from 1.2 (P2) to 4.4 (P3).

1.2.2. Reading Speed

When computing reading speeds, we considered the total number of standard-length words in the paragraphs being read, where the number of standard-length words in a paragraph is defined to be the total number of characters (including spaces and punctuation) divided by 6 [Carver 1990]. The reading speed (in words/minute) for all trials in Study 1 is shown in Table 2 (shaded cells). The data shows a large variation in reading speed, from 14 words per minute (P5, screen lens, 1 column) to 208 words per minute (P6, full screen, 3 columns). Analysis of the data using paired t-test shows that the average reading speed for the 3-column document using screen lens was faster than for the 1-column document using full screen magnification (p=0.03) or screen lens (p=0.04). In addition, the average reading speed for the 3-column document using full screen magnification was found to be significantly larger than for the 1-column document using the screen lens modality. One reason for these differences may be that the narrower columns of the 3-column document facilitate scrolling control (see also [Dyson and Haselgrove 2001]). Indeed, we noted that for some participants, finding the beginning of the next line in the 1-column document (which requires tracing back the line, seen under magnification) was a challenging task.). The data shows large variations, from 14 words per minute (P5, SL, 1 column) to 104 words per minute (P4, SL, 3 columns).

The mean reading speeds measured over all trials for these 5 participants was 42.3 words/minute, which is consistent with what found in [Harland, et al 1998] (mouse mode, low vision subjects, 44 words/minute).

1.2.3 Gaze Tracking Quality

Even though all participants successfully completed the calibration phase, analysis of the data collected shows that gaze tracking was successful (as defined by an effective reading rate of 20 Hz or more on average) only for four of the six participants: P1, P2 (except for the first trial), P4, and P6. No useful gaze data could be obtained for P3 and for P5 (except for one trial, wherein the reading rate for P5 reached 5 readings per second.) P3 was an Asian woman with narrow palpebral fissures, which may have caused poor glint detection [Blignaut and Wiul 2014]. Likewise, P5 had droopy eyelids, which also is known to create difficulties with IR-based gaze tracking [Holmqvist et al 2012]. Remarkably, gaze tracking was successful for the two participants wearing eyeglasses: P2 (except, as just mentioned, for a single trial), and P4.

1.2.4 Mouse Motion/Eye Gaze Tracks

Using a screen magnifier requires good hand control and hand-eye coordination, to ensure that the magnified area within the screen viewport includes the portion of text currently being read. It is useful to consider the relationship between focus of magnification (FoM), point of gaze on the screen, and position in the un-magnified screen of the content been gazed at. We will indicate by p the pixel location of an element of interest (e.g., the location of a text character) in the screen without magnification. When magnification is active (with FoM at pixel location m and magnification factor of α>1), the location of the same element moves to $\hat{p}$, with:

$$\hat{p}=m+\alpha(p-m) \quad (1)$$

Note that screen content at the focus of magnification does not move. When the FoM is moved (using the mouse) in a certain direction with velocity $v_1=dm/dt$, a screen element appears to move in the opposite direction, with velocity $$v_{\hat{p}}=d\hat{p}/dt=(1-\alpha)v_1 \quad (2)$$

It is also useful to compute the location p in the un-magnified screen of an element been gazed at. If the user is looking at pixel g in the magnified screen, the position of the same element in the un-magnified screen is:

$$p=(g-m)/\alpha+m \quad (3)$$

FIGS. 2 (A, C, and E) shows the mouse (FoM) tracks and gaze tracks collected, superimposed on the un-magnified screen, for a set of representative trials. The figure also shows the plots of the X- and Y-coordinate of the gaze point samples as a function of time, as well as of the location of the element looked at in the un-magnified screen (computed using Eq. (3)). The Person's correlation coefficients between the horizontal coordinates of FoM and of gaze point (when gaze tracking was successful) are shown in Table 2. Not surprisingly, gaze points are located close to the FoM in the case of screen lens (SL) magnification. This is clearly seen in the plots, and confirmed by the moderate (ρ≥0.4) to strong (ρ≥0.6) correlation coefficients between gaze point and FoM, with the notable exception of P6 for the 3-column document. P6 chose to use a wide window with a relatively low magnification (2.59), such that the window contained the whole width of the magnified column, requiring almost no horizontal motion of the window during reading. For what concerns correlation under full screen (FS) magnification, results varied from moderate correlation in the 1-column case for P1 and P6, to very weak correlation ($|\rho|<0.2$) in the other cases.

2. Example Study 2: Gaze-Based Control

This study evaluated the feasibility of a few mechanisms for gaze-contingent magnification control.

2.1 Method 2.1.1. Participants

This study included two participants from Study 1 (P2, P6) and a new participant (P7), who was not part of Study 1 (see Table 1). Of note, P2 underwent the Study 2 experiment one year after the Study 1 experiment, while P6 did both experiments in the same day.

2.1.2 Apparatus

We developed two systems for gaze-based control of full screen magnification, and one system for screen lens control, as described below.

Full Screen-Dead Zone (FS-DZ). With this control modality, the onscreen content is scrolled only when the user's gaze point is outside of a central rectangular region (dead zone). Eight scroll zones are defined bordering the dead zone (the scroll zones are invisible to the user). When gaze fixates on a scroll zone, the onscreen content is scrolled with constant velocity towards the opposite side of the screen. For example, if one is reading a line of magnified text, and reaches the rightmost scroll zone, the FoM is moved to the right (remember from Eq. (2) that the screen content appears to move in the opposite direction of the FoM). The onscreen text thus moves to the left, making more magnified content available within the viewport for reading. In order to move to the beginning of the next line, one needs to look intently at the left edge of the screen, causing the FoM to move to the left and the magnified content to the right. In the implementation used for our tests, the dead zone was set to be small, with horizontal and vertical sizes equal to ⅒ of the corresponding screen size. In practice, this meant that the screen content was scrolled most of the time. The horizontal and/or vertical component of the FoM velocity (when gaze was in a scroll zone) was set equal to 600/α pixels per second (where a is the magnification factor). The only exception was when gaze falls on the leftmost scroll zone, in which case the (horizontal) velocity was doubled. This was done to facilitate moving to the beginning of the new line, which requires full scroll of the screen content to the right.

Full Screen-Integrative (FS-I). Inspired by classic control theory, this mechanism implements an integrative controller. The general idea is to move the FoM such that the user, while reading text, is led to "naturally" gaze at a fixed location, that is chosen to be the center of the screen. Using the notation introduce earlier, where g(t) is the location of the gaze point at time t, and m(t) is the location of the FoM, the algorithm moves the FoM with velocity $v_1(t)$ defined by:

$$e(t)=g(t)-s; \quad v_1(t)=\gamma e(t) \quad (4)$$

where s is the location of the center of the screen, and γ is a positive coefficient set to 0.1/α. If gaze remains fixed at the center of the screen, the FoM also remains static. As soon as one moves their gaze to the right (e.g. while reading a line of text), the FoM also moves right, effectively scrolling the screen content to the left, with a speed that depends on the distance of the gaze point to the center of the screen. In order to reduce the risk of continuous motion due to small saccades (which could lead to motion sickness [Hoeft et al 2002; Harrison 2004]), the error term is checked against a threshold (i.e., the X- or Y-component of e(t) is set to 0 if its magnitude is smaller than a positive constant $\epsilon_B$ or $\epsilon_C$). In our experiments, we set $\epsilon_B$ and $\epsilon_C$ equal to ¹⁄₂₀ of the width and height of the screen, respectively. This effectively creates a dead zone identical to that of the FS-DZ algorithm. The main difference between the two is that, while the velocity in a scroll zone is constant for FS-DZ, it can be controlled in FS-I by moving one's gaze closer or farther away from the screen center.

Screen Lens-Integrative (SL-I). For the case of screen lens magnification, we implemented an algorithm identical to FS-I, with the critical difference that the FoM m(t) is made to smoothly move towards the current gaze point g(t), rather than towards the center of the screen. This is obtained by simply replacing the first equality in (4) with e(t)=g(t)−m(t). Note that in this case, the extent of the dead zone is set to a much smaller value.

Figure 2A:
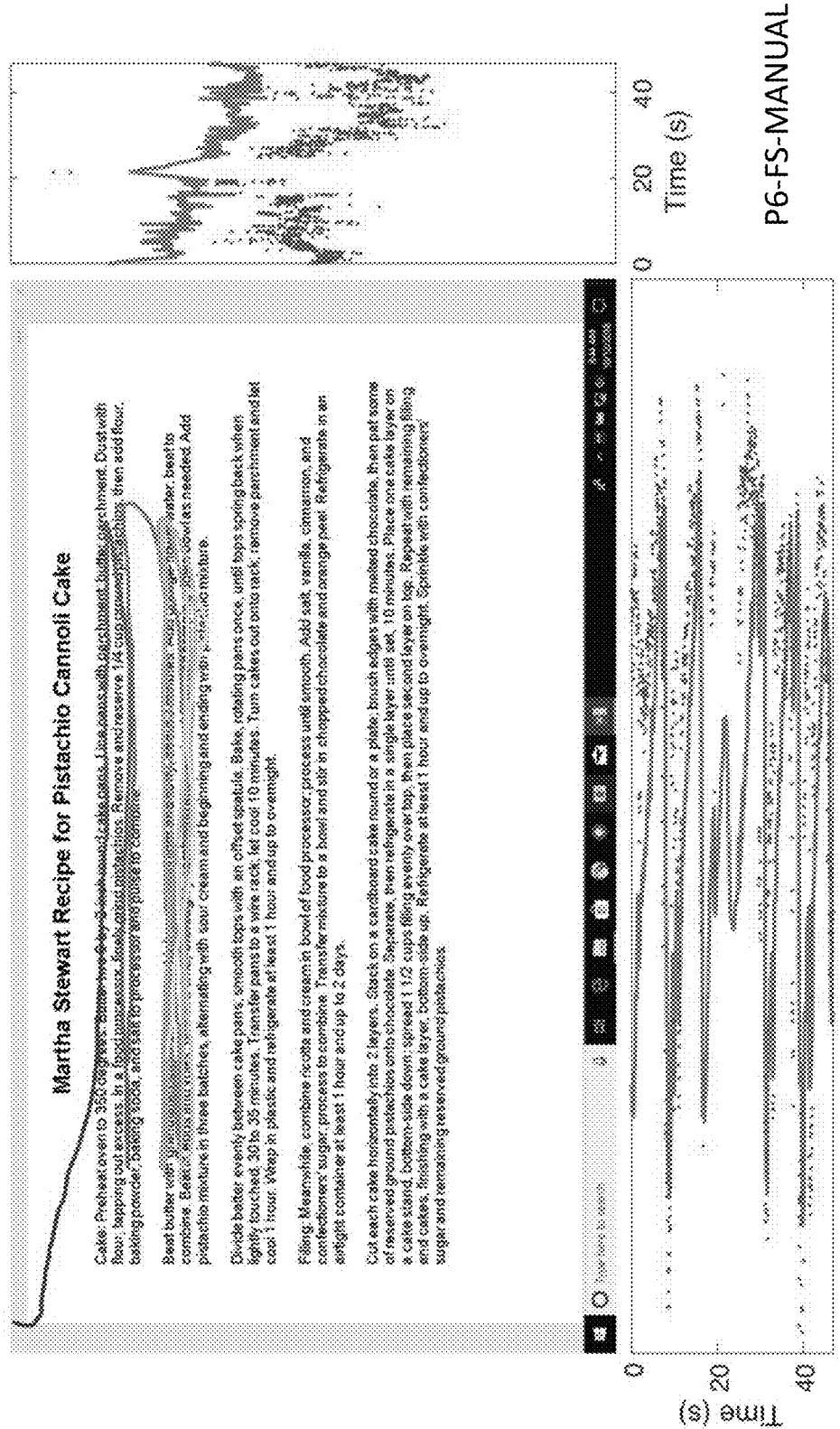
Figure 2B:
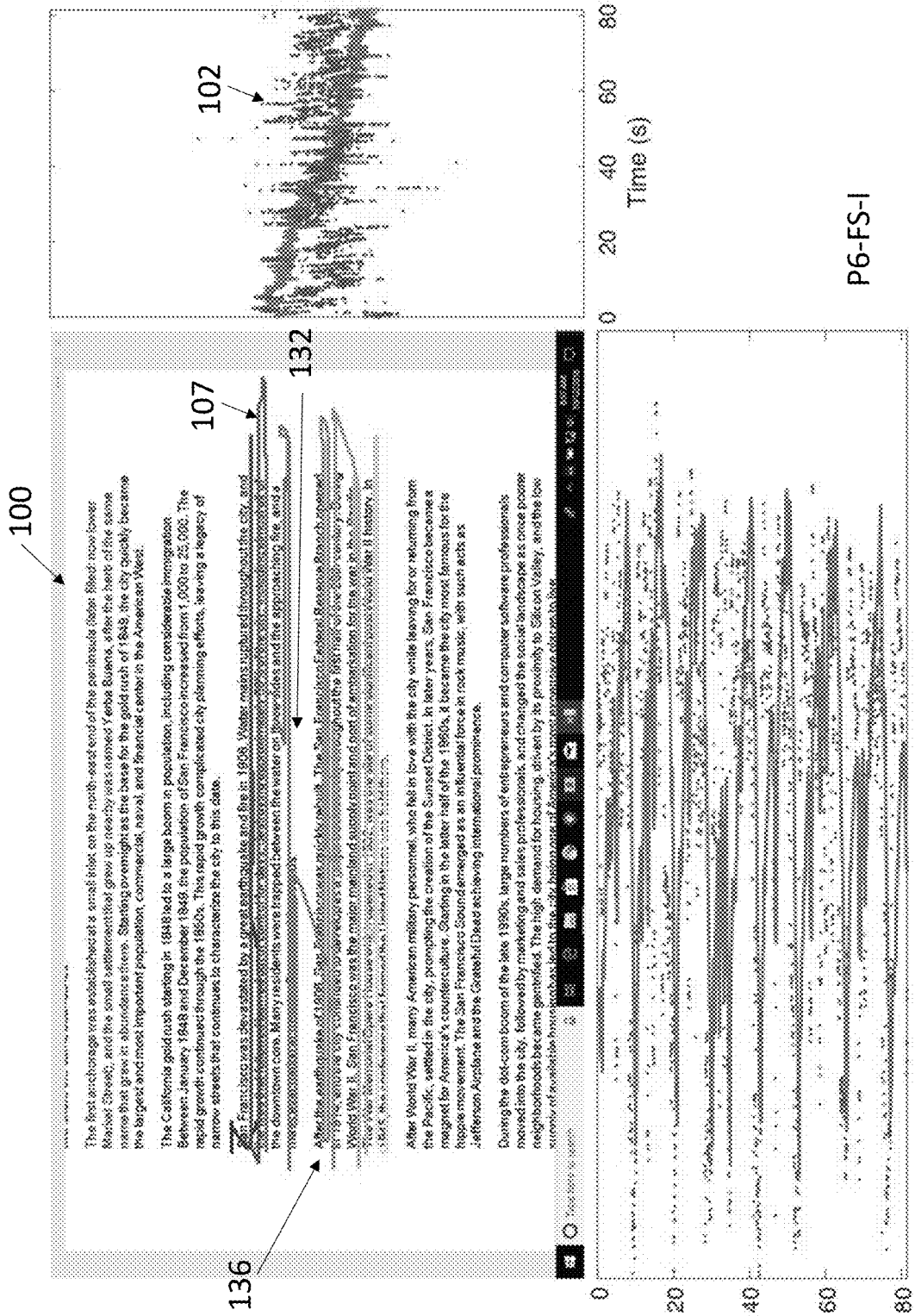
Figure 2C:
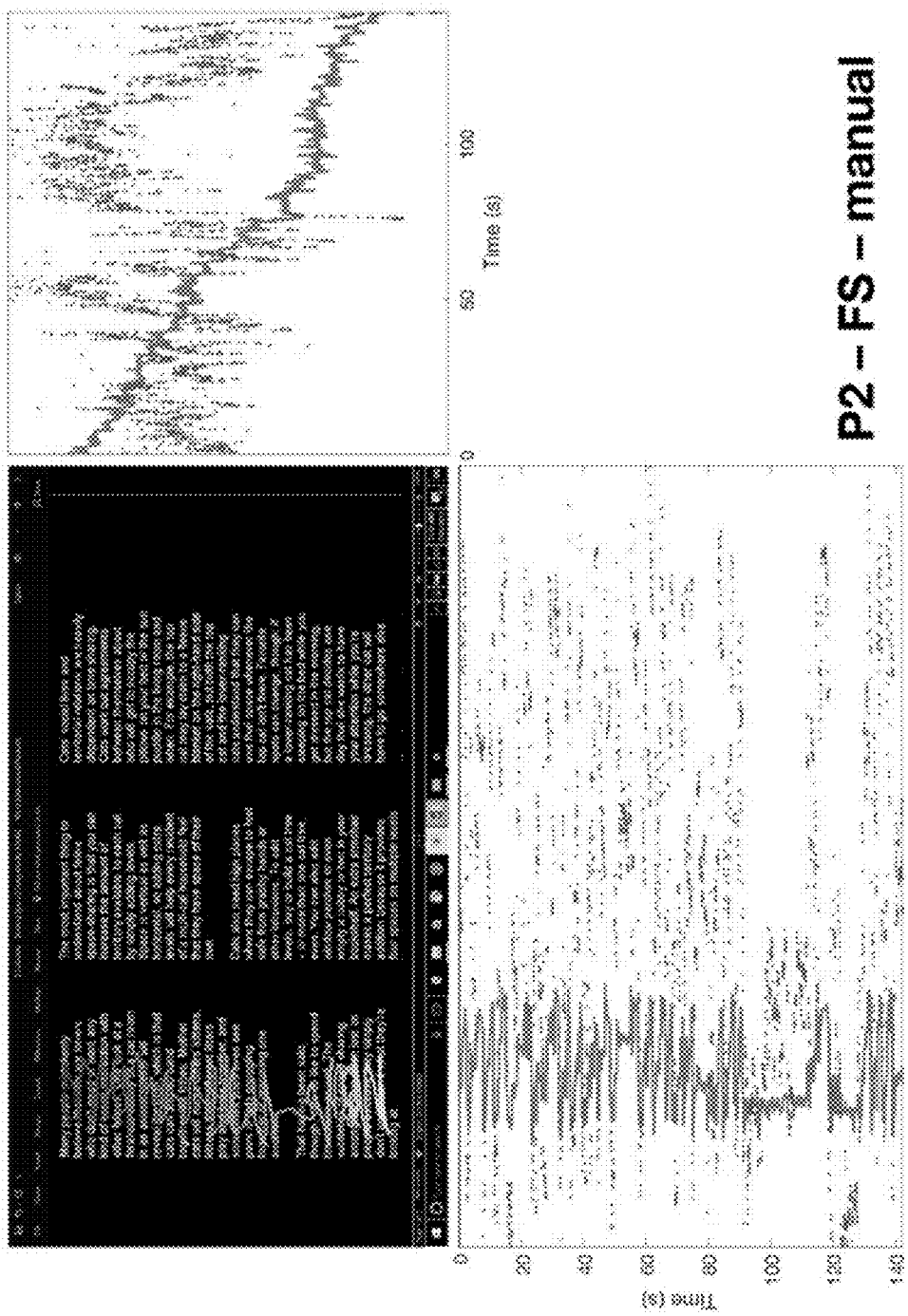
Figure 2D:
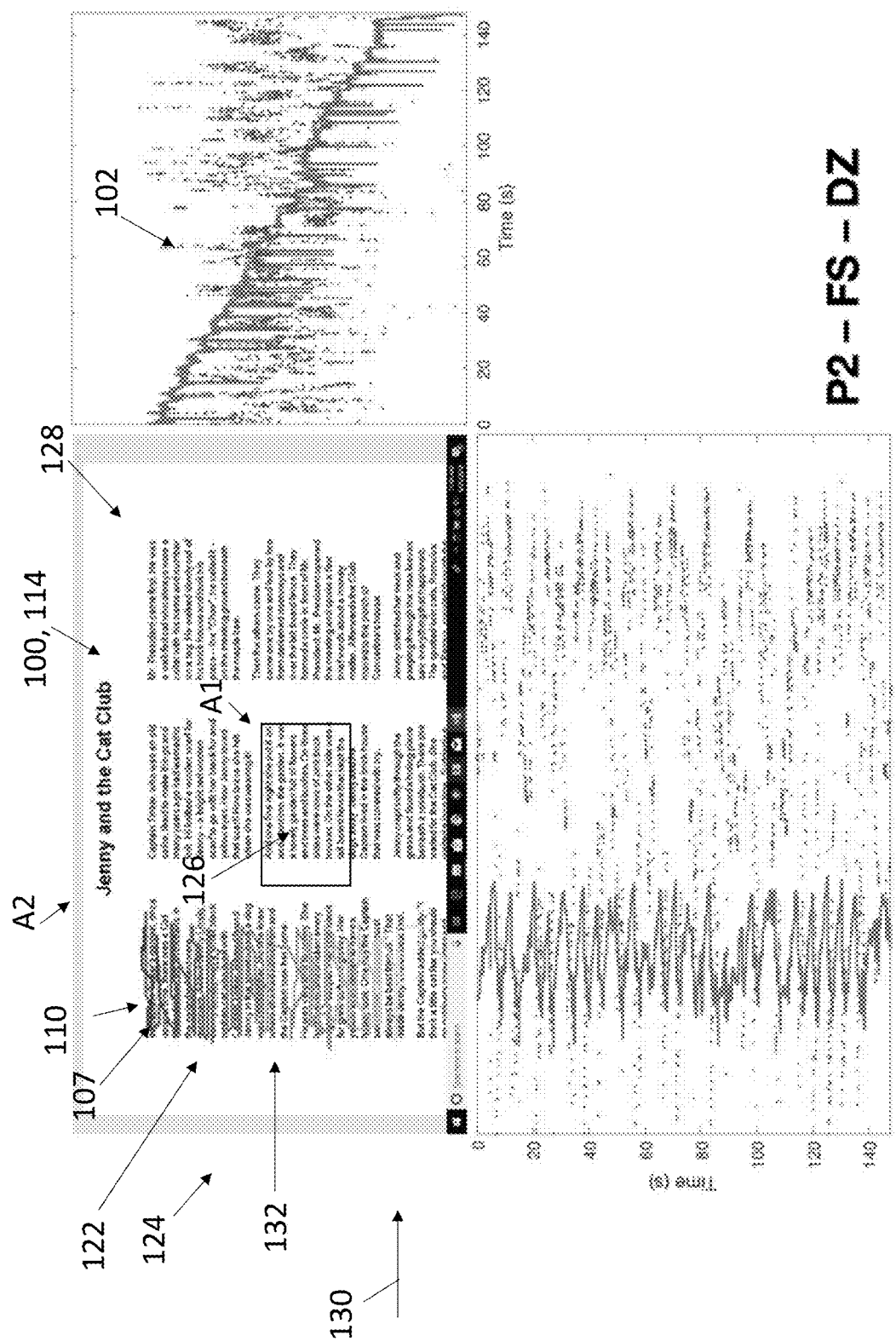
Figure 2E:
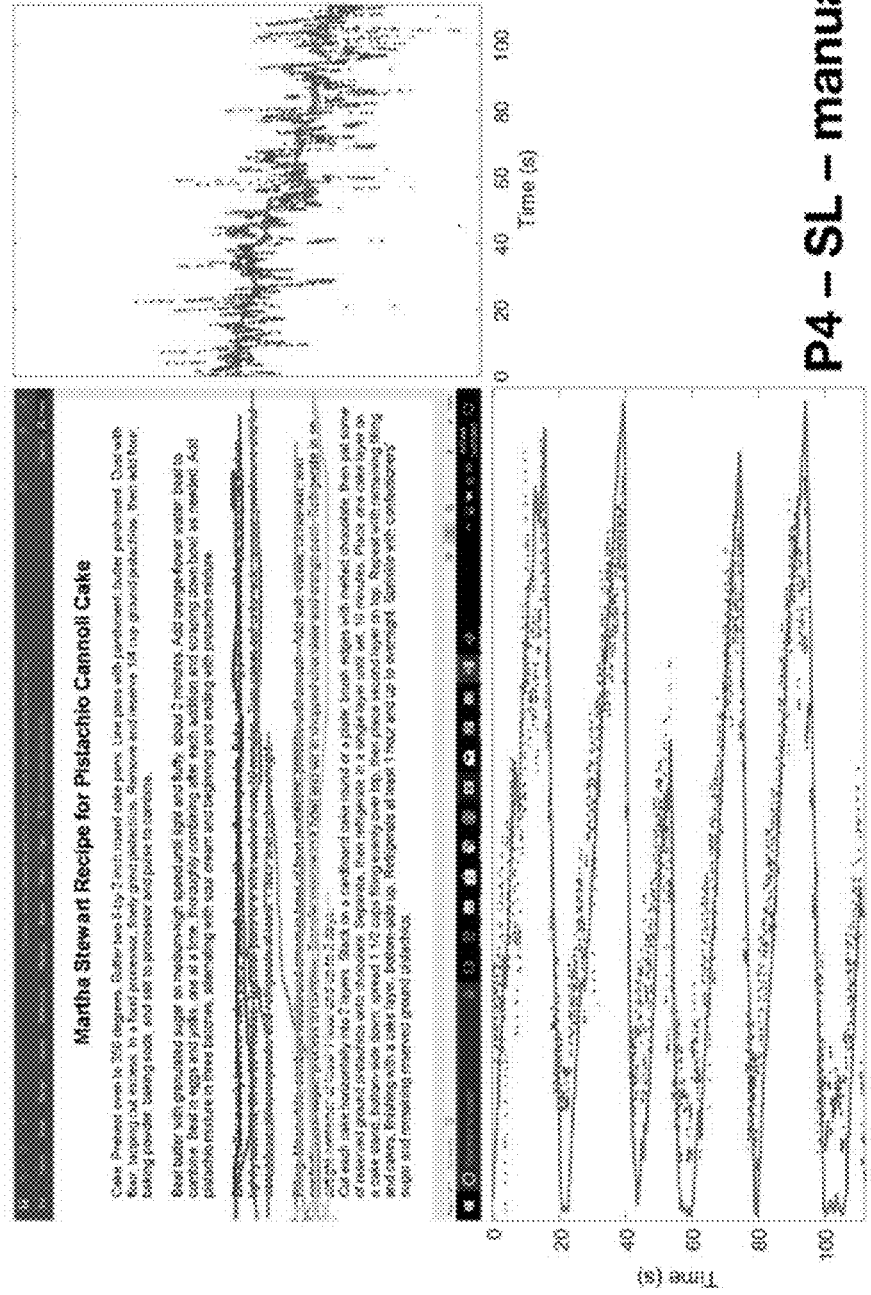
Figure 2F:
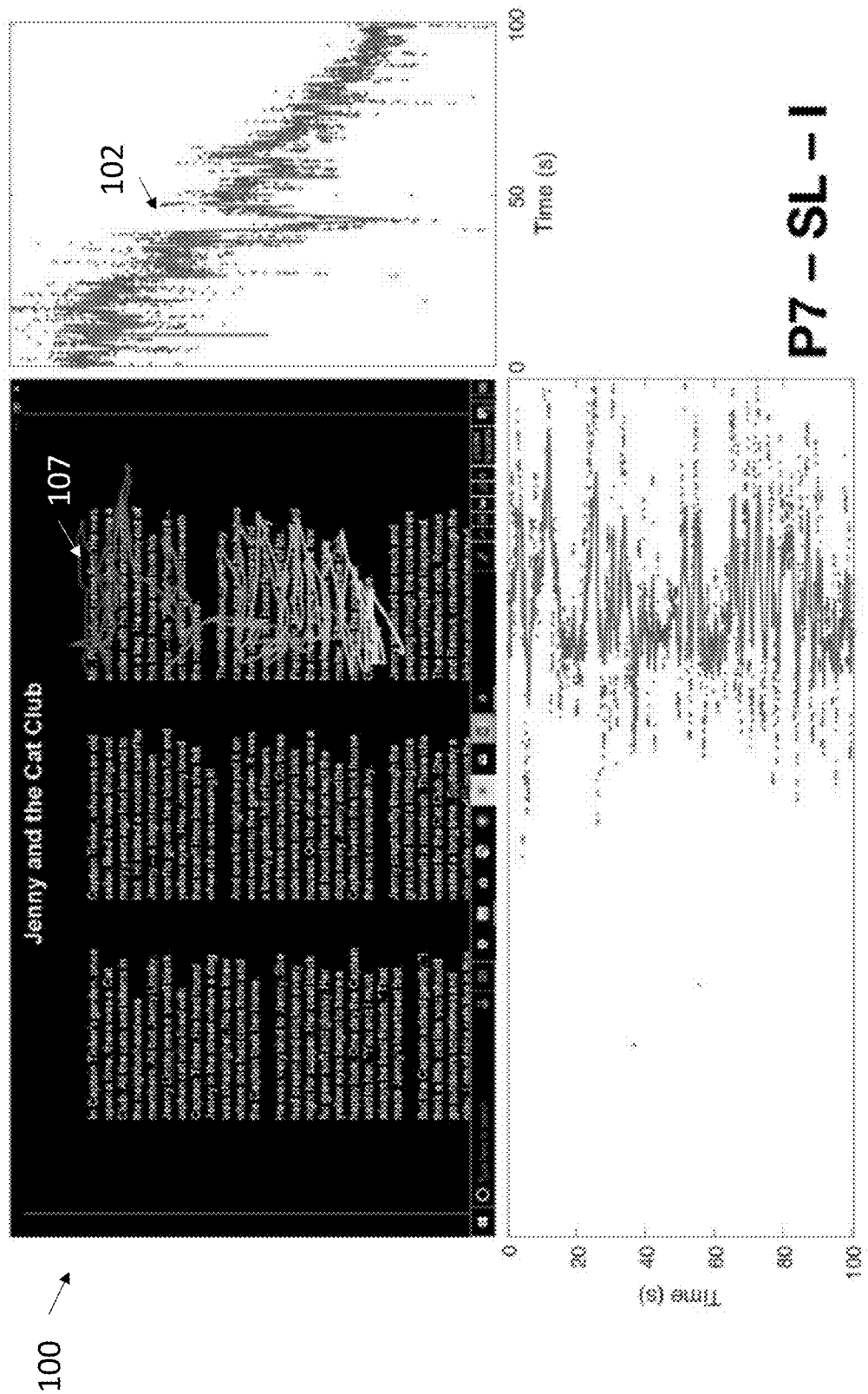

Thus, FIG. 2D (referring also to FIGS. 1A-1B) illustrates an example wherein the content 110 is scrolled on the display 100 when the gaze point 102 is in a scroll zone 122 on a first side 124 of the display 100, 622. In some examples, the scroll zone 122 is outside a central region 126 of the display 100 and the scrolling comprises scrolling the content 110 towards an opposite side 128 of the display so that more of the content 110 enters the magnification area 112 as the content 110 is read by the user 104b. In one or more examples, the central region 126 has an area A1 in a range of ⅒-⅓ of the area A2 of the display 100, a speed of the scrolling is a function of the amount of magnification, and the speed in a horizontal direction 130 is increased when the gaze point 102 is in the leftmost scroll zone 122 so as to facilitate moving to the beginning of a new line 132 of text 110a.

FIG. 2B illustrates an example wherein the focus of magnification 107 magnifies the image 116 so as to lead the gaze point 102 to a target point 134 on the display (e.g., at a center 136 of the display).

2.1.3 Experiment

The experiment was conducted in a very similar way to Study 1. The same computer and gaze tracker were used, with the difference that a mouse was not made available, as the participants were tasked with reading magnified text only using gaze-based control. Two documents were prepared for the test. The first document (1 column) contained a short description of the history of San Francisco, while the second document (3 columns) was an excerpt from a children's book ("Jenny and the Cat Club"). Participants attempted to read two paragraphs from the 1-column document using FS-DZ, then the next two paragraph using FS-I, and the final two paragraph using SL-I. The process was then repeated for the 3-column document. Before starting the trials, participants could rehearse use of FS-DZ only on the first paragraph of the 1-column document (which was reserved for this purpose).

2.2. Results 2.2.1 General Observations/Reading Speed

All three participants were able to use both systems for gaze-based full screen magnification control (FS-DZ and FS-I) without any particular difficulty (although P2 struggled while reading the 3-column document under FS-I). However, gaze-based control for the screen lens modality (SL-I) was found to be very challenging. Only P6 was able to complete the trials on both documents, while P7 was only successful in the 3-column document. P2 was not able to complete either trial with SL-I.

The reading speed was within the range of those recorded for mouse-based control (see Table 2). Note however that the reading speed for P6 using SL-I was substantially lower than for the equivalent trials with mouse control. Failure to use SL-I appeared to be caused by over-compensation when the lens was not centered where desired, which often resulted in loss of control.

All three participants complained of some fatigue and of a somewhat "unnatural" reading experience while using gaze-based control. No participant felt motion sickness. As remarked by P6, correct use of gaze-based control requires concentrations and keeping one's head stable. At times, some frustration was palpable (e.g., while using FS-I, P6 at some point jokingly cried "Stop moving!"). P7 felt that, with more experience, she would be able to better control the system. Use of LS-I was, as mentioned earlier, problematic. An interesting issue, as hinted by P6's comments, is that, while screen lens magnification gives one access to context, in the form of un-magnified content around the lens, this context could only be accessed by peripheral vision (as looking directly at it induces motion of the lens in the same direction). This may reduce the appeal of this magnification modality when controlled by gaze.

2.2.2. Mouse Motion/Eye Gaze Tracks

Figure 3:
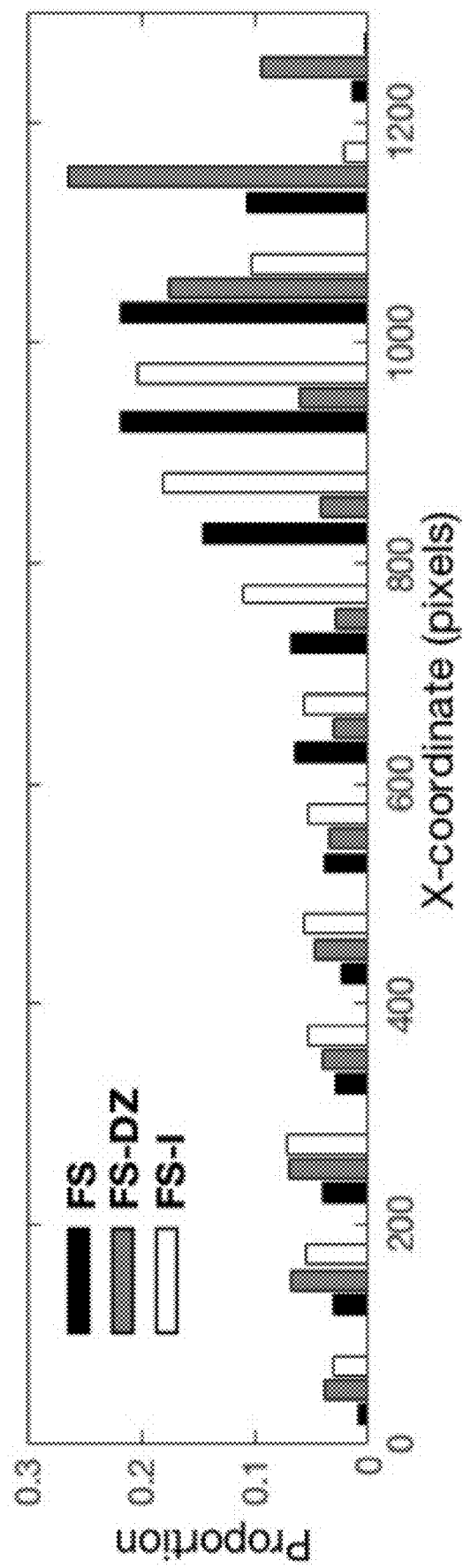
FIG. 3. Histograms of the X-coordinate of gaze points for P6 using full screen magnification in manual mode (black bars), FS-DZ (gray bars), and FS-I (white bars).

Sample mouse and gaze tracks are shown in FIGS. 2 (B, D, and F). It is interesting to compare the dynamics of gaze position when reading magnified text with the different control mechanisms. One may expect that, under FS-DZ control, more time would be spent gazing at the far right and at the far left of the screen (which is necessary to trigger scrolling); while under FS-I control, more time would be spent in the center of the screen. This is exemplified in FIG. 3, which shows the histograms of the X-coordinate of gaze point for P6 under mouse control and under the two considered gaze-based modalities for full screen magnification (The null hypothesis of equality of these distributions was rejected by the K-S test with $p \leq 10^{-3}$.)

The correlation between the horizontal coordinate of gaze point and FoM is shown in Table 2 for the successful trials. When using the screen lens (SL), correlation values between 0.3 and 0.7 were found, which mirrors what found using manual control. For the full screen (FS) case, only very weak correlation was observed.

3. Discussion

The ability to read content on a computer screen is of paramount importance in today's world. For people living with low vision, and who choose not to rely on screen readers, screen magnification software represents a convenient alternative to magnifying glasses. Magnification expands the onscreen content beyond the visible area of the screen. Hence, users of this technology must carefully scroll the magnified content using the mouse or the trackpad, such that the area of interest is correctly centered at the screen viewport. When reading text, or exploring a web page, continuous scrolling is required, which may become an annoyance at best, or, at worst, an impediment for those who have poor motion control of their hands, or who have their hands occupied while trying to read on the screen.

Our analysis brought to light several interesting aspects of the mechanisms of interaction with a manually controlled screen magnifier while reading onscreen text. The measured reading speeds show that, at least for some of our participants, use of screen magnification is challenging. While it is impossible from this data to evince exactly to what extent manual control of the magnifier contributes to slow reading, it is clear that it is a significant factor (as confirmed by prior literature [Harland, et al 1998]). The difficulty of manual control could be mitigated by better interface modalities, such as locking the X-coordinate of the mouse cursor while scanning a line (as implemented in ZoomText). Still, manual magnification control requires dexterity, and adds to the cognitive load when accessing a document. The results from Study 2 suggest that mechanisms of gaze-based control may enable reading of onscreen content without manual input, at least for full screen magnification.

In our Study 1, the Tobii Pro X2-30 failed to track gaze for two (P3, P5) of our seven participants. It has been mentioned in the literature that calibration may be difficult for patients with fixation instability (e.g. nystagmus) [Holmqvist et al 2011; Deemer et al 2018], although no related data has been published. A study [Liu et al 2016] employing seven subjects with age-related macular degeneration (AMD), who completed a number of simple fixation and dot detection tests, showed that accuracy and precision of gaze measurement was substantially worse for these subjects than for normally sighted control. However, this result does not easily translate into expected performances in reading and exploration tasks that require smooth eye movements. There is a need for a better understanding of the limitations of IR-based eye trackers for people with different low vision conditions in realistic computer interaction tasks. This is particularly important to assess the size and characteristics of the potential pool of users of our proposed gaze-contingent technology.

While Study 2 showed that gaze-contingent magnification control is feasible (at least in the full screen modality), more research is needed on the design of effortless, ergonomic, and natural gaze-based control mechanisms. Based on our experience with this system, we believe that gaze-based magnification control should be built around two critical components: (1) a predictor of the element p in the un-magnified screen the user is interested in looking at; and (2) a mechanism to decide the location $\hat{p}$ where to map this element after magnification. From these two values, an appropriate location m for the FoM could be derived using Eq. (1). Existing dynamic models (e.g. [Huang et al 2012; Cutrell and Guan 2007]) could be used to predict the next location of interest p(t) based on the measured gaze, depending on the task at hand (e.g. reading text, exploring a web site.) For what concerns the second component (finding an appropriate location $\hat{p}$ for the magnified element), different strategies are available. For example, one may choose to maintain an almost stable gaze location, while moving the FoM m(t) such that the desired text position p(t) at all times falls, after magnification, on the same or similar screen location $\hat{p}$. $m(t)=(\alpha p(t)-\hat{p})/(\alpha-1)$. In this case, one may expect little correlation between gaze point and FoM. At the other end of the spectrum, one may control the FoM such that one's gaze is led to follow the text line exactly as it would without magnification, i.e. g(t)=p(t). This can be obtained by ensuring that the FoM always falls on the location in the un-magnified screen of the text element currently being gazed at (m(t)=p(t)=g(t)).

From analysis of the gaze tracks vis-à-vis the mouse tracks from our Study 1 (including the correlation values reported in Table 2), no patterns emerged supporting either mechanism, suggesting that our participants chose control strategies that are in the middle ground between these two extremes. Ultimately, any control mechanism needs to be validated by proper user studies, which should include qualitative subjective measures besides standard quantitative metrics such as reading speed.

4. Advantages and Improvements

Gaze-contingent image magnification/enhancement. Prior systems were designed to process images at the location of the gaze point, or possibly at the preferred retinal locus (PRL; [Grosvenor and Grosvenor 2007]) of individuals with central field loss. Various image processing functions have been considered in the literature, including: "bubble" (or "fisheye" [Ashmore et al 2005; Baudisch et al 2002]) filters, which shift the image area hidden by a scotoma to a nearby peripheral area [Aguilar and Castet 2012; Loshin and Juday 1989]; band-limited contrast enhancement [Wallis et al 2015]; adjustment of letter spacing to minimize "crowding" in peripheral areas [Aguilar and Castet 2012]; and Region of Augmented Vision selection and magnification [Aguilar and Castet 2017]. Note that most of these enhancement systems, specifically developed for users with central field loss, assume that high enough magnification could potentially make the retinal stimulus much larger than the scotoma (the area of central visual field where vision is compromised), enabling them to see details that would otherwise be lost. However, for those who have adapted to the use of a PRL, and who thus put the visual stimulus in the periphery of their visual field, magnification alone is not sufficient, and other processing (contrast enhancement, crowding reduction) may be necessary. For the systems cited above to work, a high-precision gaze tracker (with resolution as high as 0.1°) is generally needed [Werblin et al 2015]. This normally requires head stabilization (e.g. by means of a chin rest) to ensure precise gaze tracking, or implementation in a head-mounted display [Deemer et al 2018]. In addition, if a seamless viewing experience is sought by attempting to center image magnification or enhancement exactly at gaze point following any saccades (including reading saccades as well as exploratory, large saccades), very low tracking and processing latency (<60 ms [Saunders and Woods 2014]) is required. In our opinion, the need for head stabilization or head-mounted display greatly reduces the practical appeal of such devices. In contrast, we aim to build a system that is easy to use in a natural viewing setting, and that could benefit a variety of users with low vision, rather than only those with central field loss. By employing a relatively large screen lens or full screen magnification, rather than a highly localized "bubble", we afford the use of low-accuracy gaze trackers that do not require expensive hardware, and allow for some amount of head motion during reading.

Text magnification for onscreen reading. Prior research (e.g., [Harland et al 1998; Zhao et al 2009; Hallett et al 2017]) has studied the performance of onscreen reading for people with low vision (sequential reading as well as non-sequential skipping or skimming modalities [Bruggeman and Legge 2002]) using different types of magnification mechanisms, with outcomes expressed in terms of reading speed or error rates. While valuable, this work does not provide sufficient insight into the role played by the manual control of the magnifier in the reading effort-specifically, the horizontal and vertical scrolling that is necessary to keep the onscreen content of interest within the viewport. In addition, although gaze tracking has been used extensively to study eye movements while reading (e.g. [Gibson and Levin 1975]), no systematic study exists that simultaneously analyzes gaze and manual control movements during magnified onscreen content access.

Embodiments of the present invention, on the other hand, provides an efficient and effortless system for controlling the screen magnifier without a mouse or trackpad. Disclosed herein is a study on the feasibility of a system that relies on the user's gaze direction to control the focus of magnification of a screen magnifier. Mouse cursor and gaze point tracks were collected and analyzed from six participants in a controlled reading experiment. This analysis may inform the design of a gaze-contingent magnification control. Gaze-based control mechanisms were evaluated with three participants in a proof-of-concept experiment. We believe that this system can find wide acceptance among individuals who are already familiar with screen magnification. In addition, it might make this useful access technology more appealing to those potential users who are currently reluctant to adopt it due to the difficulty associated with manual control of the magnifier. By enabling a more natural and ergonomic interaction with the computer while accessing magnified content, this technology has the potential to increase productivity in the workplace and proficiency in school, and to encourage opportunities for education as well as for entertainment purposes.

5. Process Steps

Method of Making

Figure 4:
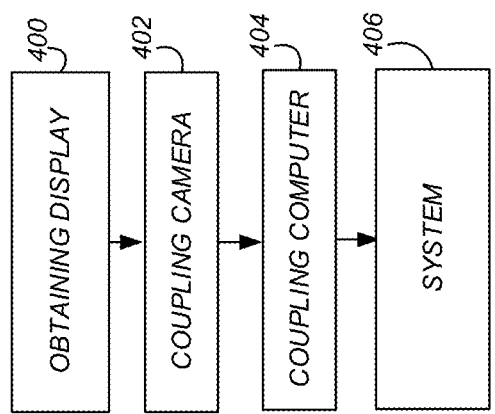
FIG. 4. Flowchart illustrating a method of making a system for magnifying content FIG. 5. Flowchart illustrating a method for operating the system.

FIG. 4 is a flowchart illustrating a method of making a system for magnifying content on a display. The method comprises the following steps.

Block 400 represents providing or obtaining display.

Block 402 represents connecting a camera to the display for acquiring a user's eye gaze direction onto the display. The camera measures a user's gaze so as to locate a gaze point on the display, the gaze point comprising a location on the display at which the user is gazing.

Block 404 represents connecting a computer to the display. In one example, the computer obtains gaze data from the gaze direction, maps the gaze data onto a desired location on the display corresponding to the gaze direction, provides a center of magnification on the display, and moves the center of magnification onto the desired location so as to magnify the content on the display. In another example, computer includes one or more processors; one or more memories; and an application stored in the one or more memories, wherein the application executed by the one or more processors determines a magnification area and an unmagnified area on the display so that the gaze point is within the magnified area, and instructs the display to magnify an image on the display in the magnification area so that the user can view the image comprising at least a portion of the content comprising text and/or graphics.

Block 406 represents the end result, a system magnifying the content on the display. The system can be embodied in many ways including, but not limited to, the following.

1. The system further comprising a gaze tracking device including the camera, wherein the gaze tracking device acquires the eye gaze direction.

2. The system wherein the computer determines the gaze data from video data outputted from the camera connected to the display.

4. The system wherein the content comprises text or graphics outputted to the display from the computer for reading by the user.

5. The system wherein the computer comprises a laptop, personal computer, a tablet, or a smartphone comprising the display. In one or more examples, the content comprises any content displayable using the computer including, but not limited to, web browsing data, word processing data, etc.

Method of Operating

Figure 5:
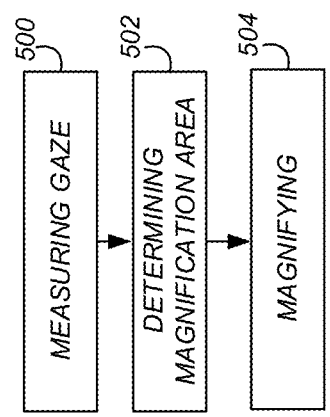
Figure 6:
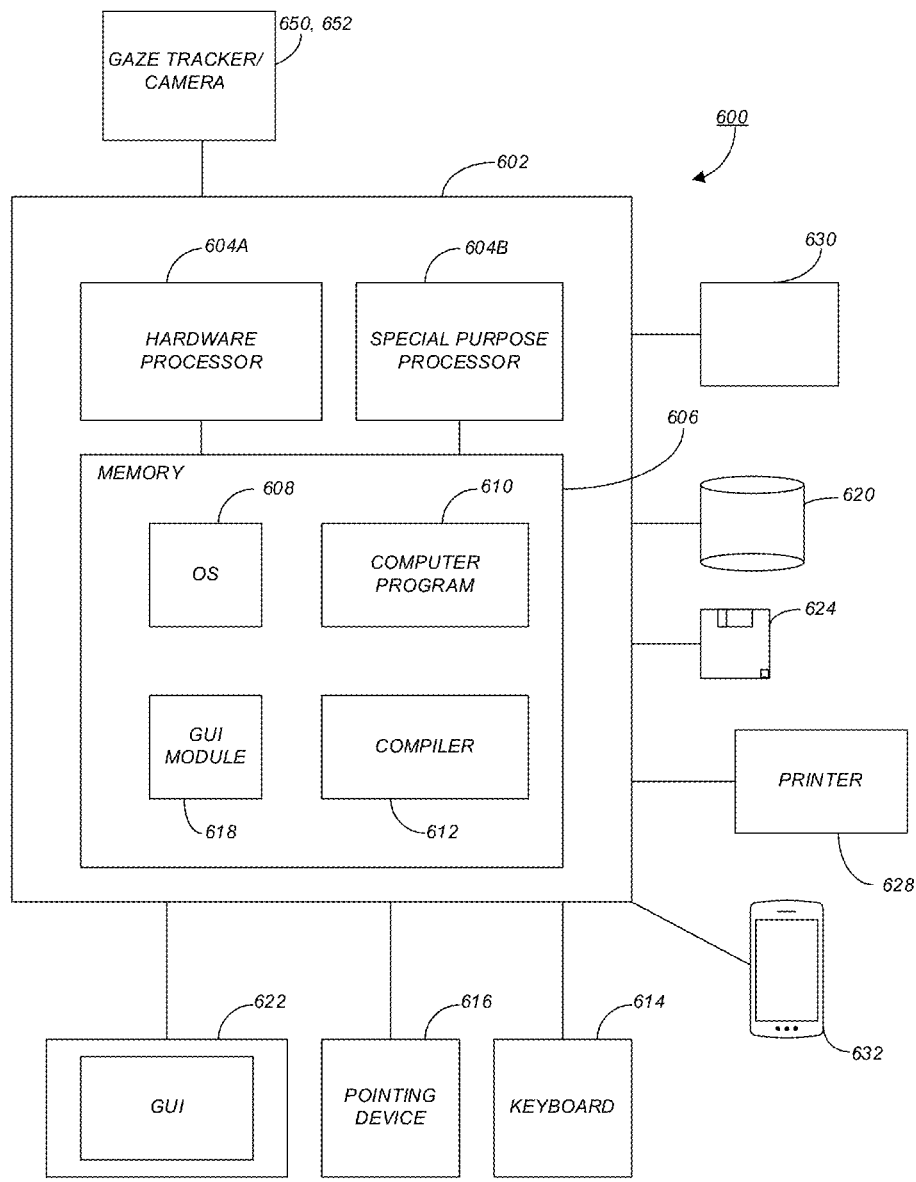
FIG. 6. Example hardware environment for performing the methods described herein.
Figure 7:
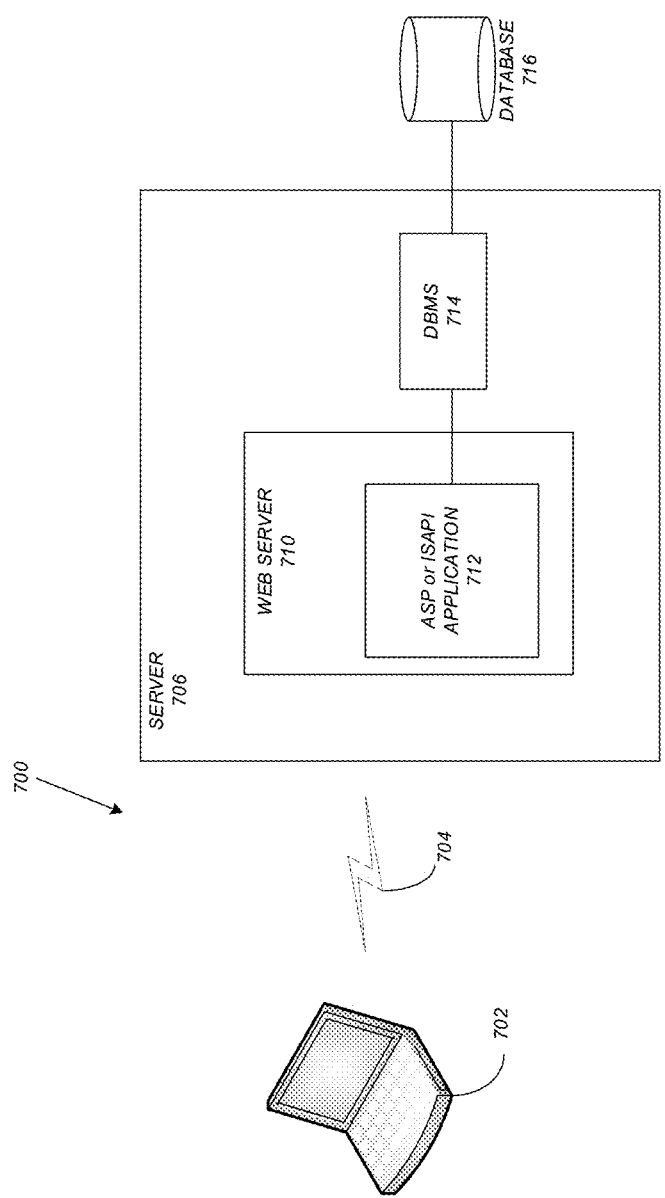
FIG. 7. Example network for performing the methods described herein.

FIG. 5 is a flowchart illustrating a computer implemented method for magnifying content on a display (e.g., using the system of FIG. 4, FIG. 6, or FIG. 7). The method comprises the following steps.

Block 500 represents measuring a user's gaze (e.g., using a camera or gaze tracking device) so as to locate a gaze point on a screen, the gaze point comprising a location on the display at which the user is gazing.

Block 502 represents determining (in a computer coupled to the display) a magnification area and an un-magnified area on the display so that gaze point is within the magnified area; and Block 504 represents using the computer to magnify an image on the display in the magnification area so that the user can view the image representing at least a portion of the content comprising text or graphics.

The method can be embodied in many ways including, but not limited to, the following.

1. The method wherein the determining further comprises locating a first pixel p in the un-magnified area prior to the gaze point moving onto the first pixel p, wherein the magnifying comprises mapping the image on the first pixel onto a second pixel p at a predetermined location.

2. The method of example 1 wherein the locating comprises predicting the first pixel based on the measurement of the user's gaze and the nature of the viewing being performed by the user.

3. The method of example 1 or 2, wherein the magnification area comprises a focus of magnification and the method further comprises moving the focus of magnification so that the predetermined location is a substantially fixed position on the display.

4. The method of example 1, wherein the locating comprises identifying a pixel on which the gaze point is located and the magnification area comprises a focus of magnification, the method further comprising moving the focus of magnification onto the pixel when the pixel is in the un-magnified area so that m(t)=p(t)=g(t), where m(t) is the position of the FOM as a function of time, p(t) is the pixel on which the gaze point is located as a function of time, and g(t) is the position of the gaze point as a function of time.

5. The method of example 1, wherein the determining comprises (1) fixing the gaze point on the display in the magnification area, or (2) tracking the gaze point and positioning the magnification area over the gaze point, or a combination of (1) and (2).

6. The method of example 1, further comprising the computer automatically scrolling the content on the display when the gaze point is in a scroll zone on the display.

7. The method of example 6, wherein the scroll zone is outside a central region of the display and the scrolling comprises scrolling the content towards an opposite side of the display so that more of the content enters the magnification area as the content is read by the user.

8. The method of example 7, wherein the central region has an area in a range of 1/10-1/3 of the area of the display, a speed of the scrolling is a function of the amount of magnification, and the speed in a horizontal direction is increased when the gaze point is in the leftmost scroll zone so as to facilitate moving to the beginning of a new line of text.

9. The method of paragraph 1, wherein the magnification area comprises a focus of magnification and the focus of magnification (FOM) magnifies the image so as to lead the gaze point to a target point on the display.

10. The method of example 9, further comprising moving the FOM towards the target point when the gaze point moves away from the target point, the FOM moving at a speed proportional to a distance between the gaze point and the target point, up to a predetermined threshold speed.

11. The method of example 10, wherein the target point is at a center of the screen.

12. The method of example 1, wherein the magnification area comprises a focus of magnification and the method further comprises moving the FOM smoothly towards the gaze point.

13. A computer implemented method for magnifying content on a display, comprising acquiring a user's eye gaze direction onto the display so as to obtain gaze data; mapping the gaze data to a gaze point on the display corresponding to the gaze direction, using a computer; defining a magnification area and an unmagnified area of the display so that the gaze point is within the magnification area; and magnifying content in the magnification area so that the user can view the content in the magnification area.

Example Hardware Environment

FIG. 6 is an exemplary hardware and software environment or system 600 used to implement one or more embodiments of the invention. The hardware and software environment includes a computer 602 and may include peripherals. Computer 602 may be a user/client computer, server computer, or may be a database computer. The computer 602 comprises a hardware processor 604A and/or a special purpose hardware processor 604B (hereinafter alternatively collectively referred to as processor 604) and a memory 606, such as random access memory (RAM). The computer 602 may be coupled to, and/or integrated with, other devices, including input/output (I/O) devices such as a keyboard 614, a cursor control device 616 (e.g., a mouse, a pointing device, pen and tablet, touch screen, multi-touch device, etc.) and a printer 628. In one or more embodiments, computer 602 may be coupled to, or may comprise, a portable or media viewing/listening device 632 (e.g., an MP3 player, IPOD, NOOK, portable digital video player, cellular device, personal digital assistant, etc.). In yet another embodiment, the computer 602 may comprise a multi-touch device, mobile phone, gaming system, internet enabled television, television set top box, or other internet enabled device executing on various platforms and operating systems.

In one embodiment, the computer 602 operates by the hardware processor 604A performing instructions defined by the computer program 610 under control of an operating system 608. The computer program 610 and/or the operating system 608 may be stored in the memory 606 and may interface with the user and/or other devices to accept input and commands and, based on such input and commands and the instructions defined by the computer program 610 and operating system 608, to provide output and results.

Output/results may be presented on the display 622 or provided to another device for presentation or further processing or action. In one embodiment, the display 622 comprises a liquid crystal display (LCD) having a plurality of separately addressable liquid crystals. Alternatively, the display 622 may comprise a light emitting diode (LED) display having clusters of red, green and blue diodes driven together to form full-color pixels. Each liquid crystal or pixel of the display 622 changes to an opaque or translucent state to form a part of the image on the display in response to the data or information generated by the processor 604 from the application of the instructions of the computer program 610 and/or operating system 608 to the input and commands. The image may be provided through a graphical user interface (GUI) module 618. Although the GUI module 618 is depicted as a separate module, the instructions performing the GUI functions can be resident or distributed in the operating system 608, the computer program 610, or implemented with special purpose memory and processors.

In one or more embodiments, the display 622 is integrated with/into the computer 602 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 602 according to the computer program 610 instructions may be implemented in a special purpose processor 604B. In this embodiment, some or all of the computer program 610 instructions may be implemented via firmware instructions stored in a read only memory (ROM), a programmable read only memory (PROM) or flash memory within the special purpose processor 604B or in memory 606. The special purpose processor 604B may also be hardwired through circuit design to perform some or all of the operations to implement the present invention. Further, the special purpose processor 604B may be a hybrid processor, which includes dedicated circuitry for performing a subset of functions, and other circuits for performing more general functions such as responding to computer program 610 instructions. In one embodiment, the special purpose processor 604B is an application specific integrated circuit (ASIC).

The computer 602 may also implement a compiler 612 that allows an application or computer program 610 written in a programming language such as C, C++, Assembly, SQL, PYTHON, PROLOG, MATLAB, RUBY, RAILS, HASKELL, or other language to be translated into processor 604 readable code. Alternatively, the compiler 612 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 610 accesses and manipulates data accepted from I/O devices and stored in the memory 606 of the computer 602 using the relationships and logic that were generated using the compiler 612.

The computer 602 also optionally comprises an external communication device such as a modem, satellite link, Ethernet card, or other device for accepting input from, and providing output to, other computers 602.

In one embodiment, instructions implementing the operating system 608, the computer program 610, and the compiler 612 are tangibly embodied in a non-transitory computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of computer program 610 instructions which, when accessed, read and executed by the computer 602, cause the computer 602 to perform the steps necessary to implement and/or use the present invention or to load the program of instructions into a memory 606, thus creating a special purpose data structure causing the computer 602 to operate as a specially programmed computer executing the method steps described herein. Computer program 610 and/or operating instructions may also be tangibly embodied in memory 606 and/or data communications devices 630, thereby making a computer program product or article of manufacture according to the invention. As such, the terms "article of manufacture," "program storage device," and "computer program product," as used herein, are intended to encompass a computer program accessible from any computer readable device or media.

FIG. 6 further illustrates the gaze tracker or camera 650 coupled to the computer.

Of course, those skilled in the art will recognize that any combination of the above components, or any number of different components, peripherals, and other devices, may be used with the computer 602.

FIG. 7 schematically illustrates a typical distributed/cloud-based computer system 700 using a network 704 to connect client computers 702 to server computers 706. A typical combination of resources may include a network 704 comprising the Internet, LANs (local area networks), WANs (wide area networks), SNA (systems network architecture) networks, or the like, clients 702 that are personal computers or workstations (as set forth in FIG. 6), and servers 706 that are personal computers, workstations, minicomputers, or mainframes (as set forth in FIG. 6). However, it may be noted that different networks such as a cellular network (e.g., GSM [global system for mobile communications] or otherwise), a satellite based network, or any other type of network may be used to connect clients 702 and servers 706 in accordance with embodiments of the invention.

A network 704 such as the Internet connects clients 702 to server computers 706. Network 704 may utilize ethernet, coaxial cable, wireless communications, radio frequency (RF), etc. to connect and provide the communication between clients 702 and servers 706. Further, in a cloud-based computing system, resources (e.g., storage, processors, applications, memory, infrastructure, etc.) in clients 702 and server computers 706 may be shared by clients 702, server computers 706, and users across one or more networks. Resources may be shared by multiple users and can be dynamically reallocated per demand. In this regard, cloud computing may be referred to as a model for enabling access to a shared pool of configurable computing resources.

Clients 702 may execute a client application or web browser and communicate with server computers 706 executing web servers 710. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 702 may be downloaded from server computer 706 to client computers 702 and installed as a plug-in or ACTIVEX control of a web browser. Accordingly, clients 702 may utilize ACTIVEX components/component object model (COM) or distributed COM (DCOM) components to provide a user interface on a display of client 702. The web server 710 is typically a program such as MICROSOFT'S INTERNET INFORMATION SERVER.

Web server 710 may host an Active Server Page (ASP) or Internet Server Application Programming Interface (ISAPI) application 712, which may be executing scripts. The scripts invoke objects that execute business logic (referred to as business objects). The business objects then manipulate data in database 716 through a database management system (DBMS) 714. Alternatively, database 716 may be part of, or connected directly to, client 702 instead of communicating/obtaining the information from database 716 across network 704. When a developer encapsulates the business functionality into objects, the system may be referred to as a component object model (COM) system. Accordingly, the scripts executing on web server 710 (and/or application 712) invoke COM objects that implement the business logic. Further, server 706 may utilize MICROSOFT'S TRANSACTION SERVER (MTS) to access required data stored in database 716 via an interface such as ADO (Active Data Objects), OLE DB (Object Linking and Embedding DataBase), or ODBC (Open DataBase Connectivity).

Generally, these components 700-716 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 702 and 706 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 702 and 706.

One more embodiments may use Application Programming Interfaces (APIs) such as, but not limited to, https://docs.microsoft.com/enus/previous-versions/windows/desktop/magapi/magapi-intro and the Tobii EyeX Engine https://developer.tobii.com/tag/eyex-sdk/

Software Embodiment Overview

Embodiments of the invention are implemented as a software application on a client 702 or server computer 706. Further, as described above, the client 702 or server computer 706 may comprise a thin client device or a portable device that has a multi-touch-based display.

System and Method Embodiments

Illustrative embodiments of the present invention include, but are not limited to, the following (referring also to FIGS. 1-7).

1. A system 600 for magnifying content on a display, comprising:

a display 622, 100;

a camera 650 for acquiring a user's eye gaze direction 104 onto the display so as to obtain gaze data; and a computer 602 coupled to the display 622, 100, wherein the computer:

maps the gaze data onto a desired location 102 on the display corresponding to the eye gaze direction 104, provides a center of magnification 106 on the display, and moves the center of magnification 106 onto the desired location 102 so as to magnify the content 110 on the display.

2 A system 600 for magnifying content on a display, comprising:

a computer 602 comprising or coupled to a display 622, 100; and a camera 650 measuring a user's gaze 104a so as to locate a gaze point 102 on the display, the gaze point 102 comprising a location on the display at which the user 104b is gazing; and the computer including one or more processors 604A, 604B; one or more memories 606; and an application 610 stored in the one or more memories, wherein the application executed by the one or more processors:

determines a magnification area 112 and an unmagnified area 114 on the display so that the gaze point is within the magnified area; and instructs the display to magnify an image 116 on the display in the magnification area 112 so that the user can view the image 116 comprising at least a portion of the content 110 comprising text 110a and/or graphics.

3. A computer implemented method for magnifying content on a display, comprising:

measuring a user's gaze 104a so as to locate a gaze point 102 on a display 622, 100, the gaze point 102 comprising a location on the display at which the user 104b is gazing; determining a magnification area 112 and an un-magnified area 114 on the display so that the gaze point is within the magnified area; and magnifying an image 116 on the display in the magnification area so that the user can view the image representing at least a portion of the content 110 comprising text 110a or graphics.

4. A computer implemented method for magnifying content on a display, comprising:

acquiring a user's eye gaze direction 104 onto the display 622, 100 so as to obtain gaze data;

mapping the gaze data to a gaze point 102 on the display corresponding to the gaze direction 104, using a computer 602;

defining a magnification area 112 and an unmagnified area 114 of the display so that the gaze point is within the magnification area; and magnifying the content 110 in the magnification area so that the user can view or read the content in the magnification area.

5. The system 600 or method of any of the examples 1-4, further comprising a gaze tracking device 652 (e.g., Tobiipro 2019) including the camera 650 (e.g., on a mount), wherein the gaze tracking device 652 acquires the eye gaze direction.

6. The system 600 or method of any of the examples 1-5, wherein the computer 602 determines the gaze data from video data outputted from the camera connected to the display 622, 100.

7. The system 600 or method of any of the examples 1-6, wherein the content 110 comprises text 110a or graphics outputted to the display 622, 100 from the computer 600 for reading by the user 104b (e.g., a human).

8. The system 600 or method of any of the examples 1-7, wherein the computer 602 comprises a tablet or a smartphone comprising the display 100, 622.

9. The system 600 or method of any of the examples 2, 3, 4 or 5-8, wherein the determining or defining further comprises the computer locating a first pixel p (118) in the un-magnified area prior to the gaze point 102 moving onto the first pixel p, wherein the magnifying comprises mapping the image on the first pixel onto a second pixel p (120) at a predetermined location 119.

10. The method or system 600 of example 9, wherein the locating comprises the computer predicting or identifying the first pixel 118 based on the measurement of the user's gaze 104a and the nature of the viewing (e.g., reading or looking at an image) being performed by the user 104b.

11. The method or system 600 of example 9, wherein the magnification area 112 comprises a focus of magnification 107 and the method further comprises moving the focus of magnification 107 so that the predetermined location 119 is a substantially fixed position on the display 100, 622.

12. The method or system 600 of any of the examples 1-8, further comprising the computer identifying a pixel 118 on which the gaze point 102 is located and wherein the magnification area 112 comprises a focus of magnification (FOM, 107), the method or system further comprising the computer (processor) moving (e.g., automatically moving) the focus of magnification 107 onto the pixel 118 when the pixel 118 is in the un-magnified area 116 so that m(t)=p(t) =g(t), where m(t) is the position of the FOM as a function of time, p(t) is the pixel on which the gaze point 102 is located as a function of time, and g(t) is the position of the gaze point 102 as a function of time.

13. The method or system 600 of any of the examples 2, 3, 4, or 5-8, wherein the determining or defining comprises (1) fixing the gaze point 102 on the display 100, 622 in the magnification area 112, or (2) tracking the gaze point 102 and positioning the magnification area 112 over the tracked gaze point 102, or a combination of (1) and (2).

14. The method or system 600 of any of the examples 1-13, further comprising the computer 602 automatically scrolling the content 110 on the display 100, 622 when the gaze point 102 is in a scroll zone 122 on a first side 124 of the display 100, 622.

15. The method or system 600 of example 14, wherein the scroll zone 122 is outside a central region 126 of the display 100 and the scrolling comprises scrolling the content 110 towards an opposite side 128 of the display 100 so that more of the content 110 enters the magnification area 112 as the content 110 is read by the user 104b.

16. The method or system 600 of example 15, wherein the central region 126 has an area A1 in a range of 1/10-1/3 of the area A2 of the display 100, a speed of the scrolling is a function of the amount of magnification, and the speed in a horizontal direction 130 is increased when the gaze point 102 is in the leftmost scroll zone 122 so as to facilitate moving to the beginning of a new line 132 of text 110a.

17. The method or system 600 of any of the examples 2, 3, 4, or 5-8, wherein the magnification area 114 comprises a focus of magnification 107 and the focus of magnification (FOM) magnifies the image 116 so as to lead the gaze point 102 to a target point 134 on the display.

18. The method or system 600 of example 17, further comprising moving the FOM towards the target point 134 when the gaze point 102 moves away from the target point 134, the FOM moving at a speed proportional to a distance between the gaze point 102 and the target point 134, up to a predetermined threshold speed.

19. The method or system 600 of example 17 or 18, wherein the target point 126 is at a center 136 of the screen or a center of the display 100.

20. The method or system 600 of any of the examples 2, 3, 4, or 5-8, wherein the magnification area 114 comprises a focus of magnification 107 and the method further comprises moving the FOM smoothly towards the gaze point 102.

21. The computer implemented system 600 or method of any of the preceding examples, comprising activating or utilizing the computer in real-time to allow magnification of the content in a real-world environment.

In various examples, the methods and systems described herein are integrated into a practical application (e.g., computer implemented screen magnifier) and improve functioning of the screen magnifier and/or computers implementing the system.

REFERENCES

The following references are incorporated by reference herein.

Aguilar, C., and E. Castet. 2012. "Use of a gaze-contingent augmented-vision aid to improve reading with central field loss." *Investigative Ophthalmology & Visual Science* 53 (14): 4390.

Aguilar, Carlos, and Eric Castet. 2017. "Evaluation of a gaze-controlled vision enhancement system for reading in visually impaired people." *PLoS One* 12 (4).

Ashmore, Michael, Andrew Duchowski, and Garth Shoemaker. 2005. "Efficient eye pointing with a fisheye lens." *Proceedings of Graphics interface* 2005.

Baudisch, Patrick, Nathaniel Good, Victoria Bellotti, and Pamela Schraedley. 2002. "Keeping things in context: A comparative evaluation of focus plus context screens, overviews, and zooming." *Proceedings of the SIGCHI conference on Human factors in computing systems.*

Beckmann, P, and G Legge. 1996. "Psychophysics of reading—XIV. The page navigation problem in using magnifiers." *Vision Research* 36 (22): 3723-3733.

Blenkhorn, Paul, Gareth Evans, Alasdair King, Sri Kurniawan, and Alistair Sutcliffe. 2003. "Screen magnifiers: Evolution and evaluation." *IEEE Computer Graphics and Applications* 25 (3): 54-61.

Blignaut, Pieter, and Daniël Wiul. 2014. "Eye-tracking data quality as affected by ethnicity and experimental design." *Behavior Research Methods* 46 (1): 67-80.

Bruggeman, Hugo, and Gordon Legge. 2002. "Psychophysics of Reading-XIX. Hypertext Search and Retrieval With Low Vision." *Proceedings of the IEEE* 90 (1): 94-103.

Carver, R. P. 1990. *Reading Rate: A Review of Research and Theory.* San Diego: Academic Press.

Cutrell, E., and Z. Guan. 2007. "What are you looking for?: An eye-tracking study of information usage in web search." *Proceedings of the SIGCHI conference on Human factors in computing systems.*

Deemer, Ashley, Christopher K Bradley, Nicole Ross, Danielle Natale, Rath Itthipanichpong, Frank Werblin, and Robert Massof 2018. "Low Vision Enhancement with Head-mounted Video Display Systems: Are We There Yet?" *Optometry and Vision Science* 95 (9): 694-703.

Dyson, M. C., and M. Haselgrove. 2001. "The influence of reading speed and line length on the effectiveness of reading from screen." *International Journal of Human-Computer Studies* 54 (4): 585-612.

Gibson, Eleanor, and Harry Levin. 1975. *The psychology of reading.* The MIT Press.

Granquist, Christina, Yueh-Hsun Wu, Rachel Gage, Michael Crossland, and Gordon Legge. 2018. "How People with Low Vision Achieve Magnification in Digital Reading." *Optometry and Vision Science* 95 (9): 711-719.

Grosvenor, T., and T. P. Grosvenor. 2007. *Primary care optometry.* Elsevier Health Sciences.

Hallett, Elyse, Dick Wayne, Tom Jewett, and Kim-Phuong Vu. 2017. "How Screen Magnification with and Without Word-Wrapping Affects the User Experience of Adults with Low Vision." *International Conference on Applied Human Factors and Ergonomics* (AHFE 2017).

Harland, Stephen, Gordon Legge, and Andrew Luebker. 1998. "Psycophysics of Reading: XVII. Low-vision performances with four types of electronically magnified text." *Optometry and Vision Science* 75 (3): 183-190.

Harrison, Chandra. 2004. "Low-vision reading aids: reading as a pleasurable experience." *Personal and Ubiquitous Computing* 8 (304): 213-220.

Hoeft, Reagan, Wendi Buff, Elizabeth Cook, Kay Stanney, and Stacy Wilson. 2002. "Improving Assistive Technologies for the Visually Impaired: Minimizing the Side Effects of Magnification Products." *Proceedings of the Human Factors and Ergonomics Society Annual Meeting*.

Holmqvist, Kenneth, Marcus Nyström, and Fionna Mulvey. 2012. "Eye tracker data quality: what it is and how to measure it." *Proceedings of the ACM Symposium on Eye Tracking Research and Applications*.

Holmqvist, Kenneth, Marcus Nystrom, Richard Andresson, Richard Dewhurst, Halszka Jarodzka, and Joost Van de Weijer. 2011. *Eye tracking: A comprehensive guide to methods and measures*. Oxford: OUP.

Huang, J., R. White, and G. Buscher. 2012. "User see, user point: Gaze and cursor alignment in web search." *Proceedings of the SIGCHI Conference on Human Factors in Computing Systems*.

Liu, Huiying, Damon Wong, Ai Ping Yow, Yanwu Xu, Fengshou Yin, Augustinus Laude, and Tock Ham Lim. 2016. "Determining the difference in eyegaze measurements in individuals with Age related Macular Degeneration." 38*th Annual International Conference of the IEEE Engineering in Medicine and Biology Society* (*EMBC*).

Loshin, David, and Richard Juday. 1989. "The programmable remapper: Clinical applications for patients with field defects." *Optometry and Vision Science* 389-395.

Microsoft Magnification API. n.d. Accessed Sep. 16, 2019. https://docs.microsoft.com/en-us/windows/win32/api/_magpi/.

Saunders, Daniel, and Russell Woods. 2014. "Direct measurement of the system latency of gaze-contingent displays." *Behavior research methods* 46 (2): 439-447.

Tobii EyeX SDK. n.d. Accessed Sep. 16, 2019. https://developer.tobii.com/tag/eyex-sdk/.

Tobii 2019. "Specification of gaze accuracy and gaze precision, Tobii X2-30 Eye Tracker." Accessed Sep. 16, 2019. https://www.tobiipro.com/siteassets/tobii-pro/technical-specifications/tobii-pro-x2-30-technical-specification.pdf.

Toet, A. 2006. "Gaze directed displays as an enabling technology for attention aware systems." *Computers in Human Behavior* 22 (4): 615-647.

Wallis, Thomas, Michael Dorr, and Peter Bex. 2015. "Sensitivity to gaze-contingent contrast increments in naturalistic movies: An exploratory report and model comparison." *Journal of vision* 15 (8): 3.

Werblin, Frank, Robert Massof, Nicole Ross, Danielle Natale, Chris Bradley, Boger Yuval, and David Teitelbaum. 2015. "Gaze-Directed Magnification: Developing a Head-Mounted, Wide Field, Immersive Electronic Low Vision Aid." *ARVO Annual Meeting Abstract*.

Zhao, Zhengxuan, Pei-Luen Rau, Ting Zhang, and Gavriel Salvendy. 2009. "Visual search-based design and evaluation of screen magnifiers for older and visually impaired users." *Int. J. Human-Comp*.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for magnifying content on a display, comprising:
    measuring a user's gaze so as to locate a gaze point on a display, the gaze point comprising a location on the display at which the user is gazing;
    determining a magnification area and an un-magnified area on the display so that the gaze point is within the magnification area;
    magnifying an image on the display in the magnification area so that the user can view the image representing at least a portion of the content comprising text or graphics;
    providing a focus of magnification (FOM) on the display; and
    moving the FOM towards a target comprising a target point when the gaze point moves away from the target point, wherein the FOM moves at a speed proportional to a distance between the gaze point and the target point, up to a predetermined threshold speed, and
    wherein the FOM magnifies the image so as to lead the gaze point to the target on the display.

2. The method of claim 1, wherein: the determining further comprises locating a first pixel p in the un-magnified area prior to the gaze point moving onto the first pixel p, and the magnifying comprises mapping the image on the first pixel onto a second pixel p at a predetermined location.

3. The method of claim 2, wherein the locating comprises predicting or identifying the first pixel based on the measurement of the user's gaze and the nature of the viewing being performed by the user.

4. The method of claim 2, wherein the magnification area comprises a focus of magnification and the method further comprises moving the focus of magnification so that the predetermined location is a substantially fixed position on the display.

5. The method of claim 1, further comprising identifying a pixel on which the gaze point is located and providing a focus of magnification (FOM), the method further comprising moving the focus of magnification onto the pixel when the pixel is in the un-magnified area so that $m(t)=p(t)=g(t)$, where $m(t)$ is the position of the FOM as a function of time, $p(t)$ is the pixel on which the gaze point is located as a function of time, and $g(t)$ is the position of the gaze point as a function of time.

6. The method of claim 1, wherein the determining comprises (1) fixing the gaze point on the display in the magnification area, or (2) tracking the gaze point and positioning the magnification area over the tracked gaze point, or a combination of (1) and (2).

7. The method of claim 1, further comprising the computer automatically scrolling the content on the display when the gaze point is in a scroll zone on the display and so that more of the content enters the magnification area.

8. The method of claim 7, wherein the scroll zone is outside a central region of the display and the scrolling comprises scrolling the content towards an opposite side of the display so that more of the content enters the magnification area as the content is read by the user.

9. The method of claim 8, wherein the central region has an area in a range of $\frac{1}{10}$-$\frac{1}{3}$ of the area of the display, a speed of the scrolling is a function of the amount of magnification, and the speed in a horizontal direction is increased when the gaze point is in the leftmost scroll zone so as to facilitate moving to the beginning of a new line of text.

10. The method of claim 1, wherein the target point is at a center of the display.

11. The method of claim 1, wherein the magnification area comprises a focus of magnification and the method further comprises moving the FOM smoothly towards the gaze point.

12. The method of claim 1, wherein the method is performed using a computer comprising a tablet or smartphone comprising the display.

13. A system for magnifying content on a display, comprising:
- a computer comprising or coupled to a display; and
- a camera positioned for measuring a user's gaze so as to locate a gaze point on the display, the gaze point comprising a location on the display at which the user is gazing; and
- the computer including one or more processors; one or more memories; and an application stored in the one or more memories, wherein the application executed by the one or more processors:
- determines a magnification area and an unmagnified area on the display so that the gaze point is within the magnification area;
- instructs the display to magnify an image on the display in the magnification area so that the user can view the image comprising at least a portion of the content comprising at least one of text or graphics; and wherein the computer;
- magnifies the image, provides a focus of magnification (FOM) on the display, and moves the FOM towards a target coprising a target point when the gazze point moves away from the target point, and wherein the FOM magnifies the image so as to lead the gaze point to the target on the display.

14. The system of claim 13, further comprising a gaze tracking device including the camera, wherein the gaze tracking device acquires the user's eye gaze direction so as to obtain the gaze point.

15. The system of claim 13, wherein the computer determines the gaze point from video data outputted from the camera connected to the display.

16. The system of claim 13, wherein the computer comprises a tablet or a smartphone comprising the display.

17. The system of claim 13, wherein the target point is at a center of the display.

18. The system of claim 13, further comprising:
- the computer identifying a pixel on which the gaze point is located; and
- the computer automatically moving the focus of magnification onto the pixel when the pixel is in the un-magnified area so that $m(t)=p(t)=g(t)$, where $m(t)$ is the position of the FOM as a function of time, $p(t)$ is the pixel on which the gaze point is located as a function of time, and $g(t)$ is the position of the gaze point as a function of time.

19. The system of claim 13, wherein the wherein the computer:
- automatically scrolls the content on the display into the magnification area when the gaze point is in a scroll zone on the display.

20. The system of claim 13, further comprising a plurality of scroll zones outside a central region of the display, wherein the computer scrolls the content towards an opposite side of the display so that more of the content enters the magnification area as the content is read by the user, including:
- if the user is reading a line of the content comprising text, and reaches the one of the scroll zones on the right edge of the screen, the FOM is moved to the right and the text moves to the left into the magnification area, and
- in order to move to a beginning of the next line, the user looking at the one of the scroll zones at the left edge of the display causes the FOM to move to the left and the text to move into the magnification area.

21. A computer implemented method for magnifying content on a display, comprising:
- measuring a user's gaze so as to locate a gaze point on a display, the gaze point comprising a location on the display at which the user is gazing;
- determining a magnification area and an un-magnified area on the display so that the gaze point is within the magnification area;
- magnifying an image on the display in the magnification area so that the user can view the image representing at least a portion of the content comprising text or graphics,
- providing a focus of magnification (FOM) in the magnification area on the display; and
- moving the FOM when the gaze point moves away, wherein the FOM moves at a speed proportional to a distance between the gaze point and a point on the display, up to a predetermined threshold speed.

22. The method of claim 21, wherein the method is performed using a computer comprising a tablet or a smartphone comprising the display.

* * * * *